(12) United States Patent
See et al.

(10) Patent No.: US 12,547,853 B2
(45) Date of Patent: Feb. 10, 2026

(54) DEVICE RELEASABLY COUPLABLE TO AN ELECTRIC ASSET, AND A METHOD FOR OBTAINING IDENTIFICATION OF AT LEAST ONE ELECTRIC ASSET AND INFORMATION ON PARTIAL DISCHARGE EXPERIENCED BY THE AT LEAST ONE ELECTRIC ASSET

(71) Applicant: Nanyang Technological University, Singapore (SG)

(72) Inventors: Kye Yak See, Singapore (SG); Muhammad Faeyz Karim, Singapore (SG); Zhenning Yang, Singapore (SG)

(73) Assignee: Nanyang Technological University, Singapore (SG)

( * ) Notice: Subject to any disclaimer, the term of this patent is extended or adjusted under 35 U.S.C. 154(b) by 161 days.

(21) Appl. No.: 18/728,834

(22) PCT Filed: Jun. 6, 2022

(86) PCT No.: PCT/SG2022/050384
§ 371 (c)(1),
(2) Date: Jul. 12, 2024

(87) PCT Pub. No.: WO2022/260593
PCT Pub. Date: Dec. 15, 2022

(65) Prior Publication Data
US 2025/0094742 A1 Mar. 20, 2025

(30) Foreign Application Priority Data
Jun. 9, 2021 (SG) .......................... 10202106164Q

(51) Int. Cl.
*G06K 7/10* (2006.01)
*G06K 19/07* (2006.01)

(52) U.S. Cl.
CPC ..... *G06K 7/10297* (2013.01); *G06K 19/0723* (2013.01)

(58) Field of Classification Search
CPC ........ G06K 7/10297; G06K 7/00; G06K 7/08; G06K 7/081; G06K 19/0723; G06K 19/00
(Continued)

(56) References Cited

U.S. PATENT DOCUMENTS

| 8,179,231 B1* | 5/2012 | Varahramyan | G06K 19/0672 340/572.1 |
|---|---|---|---|
| 2006/0103535 A1* | 5/2006 | Pahlaven | G06K 7/10306 340/572.1 |
| 2018/0275246 A1* | 9/2018 | Ma | G01S 13/765 |

FOREIGN PATENT DOCUMENTS

| CN | 204422708 U | 6/2015 |
|---|---|---|
| WO | 2015/061827 A1 | 5/2015 |

OTHER PUBLICATIONS

Cui, Z. et al., Wideband UHF Antenna for Partial Discharge Detection, Applied Sciences, Mar. 2, 2020, vol. 10, No. 5, pp. 1698.
(Continued)

*Primary Examiner* — Edwyn Labaze
(74) *Attorney, Agent, or Firm* — Morse, Barnes-Brown & Pendleton, P.C.; Martin Z. Zhang, Esq.

(57) ABSTRACT

According to embodiments of the present invention, a device releasably couplable to an electric asset is provided. The device includes a sensor configured to detect partial discharge from the electric asset and generate a pulsed signal representative of a presence or absence of the detected partial discharge; and a time-domain based RFID tag electrically coupled to the sensor. The time domain-based RFID tag is configured to provide an ID code uniquely representative of a location of the device when coupled to the electric asset. The device is configured to generate, upon interroga-
(Continued)

tion by an external interrogator, a backscattered signal including the ID code and the pulsed signal. The generated backscattered signal is to be read by an external reader. According to further embodiments, a method for obtaining identification of at least one electric asset and information on partial discharge experienced by the at least one electric asset is also provided.

20 Claims, 20 Drawing Sheets

(58) Field of Classification Search
USPC .................................. 235/451, 439, 375, 487
See application file for complete search history.

(56) References Cited

OTHER PUBLICATIONS

International Search Report and Written Opinion of International Application No. PCT/SG2022/050384 mailed Dec. 15, 2022.
Mandel, C. et al., Higher Order Pulse Modulators for Time Domain Chipless RFID Tags with Increased Information Density, 2015 European Microwave Conference (EuMC 2015), Dec. 3, 2015, pp. 100-103.
Mandel, C. et al., Wireless Temperature Sensing with BST-Based Chipless Transponder Utilizing a Passive Phase Modulation Scheme. Frequenz, Aug. 25, 2011, vol. 65, No. 7-8, pp. 225-231.

* cited by examiner (a)

(b)

(c)

(d)

DEVICE RELEASABLY COUPLABLE TO AN ELECTRIC ASSET, AND A METHOD FOR OBTAINING IDENTIFICATION OF AT LEAST ONE ELECTRIC ASSET AND INFORMATION ON PARTIAL DISCHARGE EXPERIENCED BY THE AT LEAST ONE ELECTRIC ASSET

CROSS-REFERENCE TO RELATED APPLICATIONS

This application is a U.S. national stage filing under 35 U.S.C. 371 of International Application No. PCT/SG2022/050384, filed Jun. 6, 2022, which claims the benefit of priority of Singapore patent application Ser. No. 10202106164Q, filed 9 Jun. 2021. The entire teachings of the above applications are hereby incorporated by reference in their entirety. International Application No. PCT/SG2022/050384 was published under PCT Article 21(2) in English.

TECHNICAL FIELD

Various embodiments relate to a device releasably couplable to an electric asset, and a method for obtaining identification of at least one electric asset and information on partial discharge experienced by the at least one electric asset.

BACKGROUND

A partial discharge (PD) is a localized dielectric breakdown of electrical insulation within an electrical asset that operates at high voltage, which reveals hidden dielectric-related defects within of the insulation. If the PD is left undetected, the electrical asset deteriorates and subsequently leads to an unexpected breakdown. Hence, detection of the PD is essential to prevent an expected failure of a critical electrical asset.

The PD may be detected by various sensors, such as pulsed current sensor, acoustic sensor, optical sensor and radio frequency (RF) sensor. For example, the pulsed current sensor detects the high-frequency spectral content of the current during the PD event, but its detection capability may be affected if there is a strong presence of high-frequency non-PD related background noise. An acoustic sensor detects acoustic wave associated with the PD, but the wave propagation may be influenced by the structures of the electrical asset, and its detection may be challenging in a city environment with high acoustic background noise. Optical sensor has high sensitivity and compact in size, but its implementation is intrusive. RF emission sensor detects the PD by capturing and analyzing the electromagnetic (EM) wave associated with the PD. RF emission sensors have gained its popularity because of the relative ease of implementation and its non-intrusive nature. If the RF receiving antenna is chosen as the sensor for the EM wave associated with the PD, it is placed several meters away from the electrical asset, which is in the far-field region of the EM wave. If the RF sensing coil is chosen as the sensor for the EM wave, it is mounted on the electrical asset, which is the near-field region of the EM wave. For the PD detection in the far-field region, several receiving antennas placed at different locations are necessary so that localization of the PD source may be estimated based on different time-of-arrival of the EM wave at the antennas. It has been reported that the theoretical PD source detection accuracy is 39.3 mm through simulation for an empty volume of about 10 m (length, L)×4 m (width, W)×4 m (height, H) based on a total of 4 antennas but not validated experimentally. In reality, the PD source localization accuracy based on time-of-arrival analysis depends on the number of possible EM wave propagation paths due to reflections within and outside the electrical asset. Also, the detected PD signal at the antenna is in μV range, which may not be easily distinguishable if there is strong EM background noise present in the environment.

In a situation where more than one electrical asset is employed, it may be extremely challenging and at times, impossible to identify the correct electrical asset the PD signal is from.

RFID is a contactless ID technology that automatically identifies target objects and obtains relevant data by RF signals without manual intervention. However, comparing with barcodes, the higher fabrication cost limits chip-based RFID tags to be used widely. One of the recent advancements of RFID technology is chipless RFID, which refers to RFID tags that do not contain silicon chips. It lowers the fabrication cost and has been integrated with pressure, humidity, temperature, gas and strain sensors for practical applications. Without the silicon chip, the chipless RFID tag has the inherent ability to withstand the harsh operating environment.

A frequency-domain (FD) based chipless RFID approach has been reported. It detects the EM wave through a wideband antenna and modulates the frequency signature with two-step impedance resonators (SIRs). Although the FD-based chipless RFID approach has demonstrated its ability to facilitate identifiable detection simultaneously, it requires wide bandwidth and results in higher design cost of the reader.

Thus, there is a need to provide a device and/or an apparatus, as well as a method to obtain identification of an electric asset and information on partial discharge experienced by the electric asset, while addressing at least the problems mentioned above.

SUMMARY

According to an embodiment, a device releasably couplable to an electric asset is provided. The device may include a sensor configured to detect partial discharge from the electric asset and generate a pulsed signal representative of a presence or absence of the detected partial discharge; and a time-domain based RFID tag electrically coupled to the sensor, the time-domain based RFID tag configured to provide an ID code uniquely representative of a location of the device when coupled to the electric asset. The device may be configured to generate, upon interrogation by an external interrogator, a backscattered signal including the ID code and the pulsed signal, and the generated backscattered signal may be read by an external reader.

According to an embodiment, an apparatus is provided. The apparatus may include at least one device in accordance with various embodiments, each device releasably couplable to each corresponding electric asset; an external interrogator configured to interrogate the at least one device to generate a backscattered signal; and an external reader configured to read the backscattered signal to obtain identification of the corresponding electric asset and information on partial discharge experienced by the corresponding electric asset.

According to an embodiment, a method for obtaining identification of at least one electric asset and information on partial discharge experienced by the at least one electric asset is provided. The method may include sending, by an external interrogator, an interrogation signal to at least one device, each device releasably coupled to each corresponding electric asset; detecting, by each device, the partial discharge from the corresponding electric asset; generating, by each device, a backscattered signal comprising an ID code uniquely representative of a location of the device coupled to the corresponding electric asset and a pulsed signal representative of a presence or absence of the detected partial discharge; and reading, by an external reader, the backscattered signal to obtain identification of the corresponding electric asset and information on partial discharge experienced by the corresponding electric asset.

BRIEF DESCRIPTION OF THE DRAWINGS

In the drawings, like reference characters generally refer to like parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

Figure 1A:
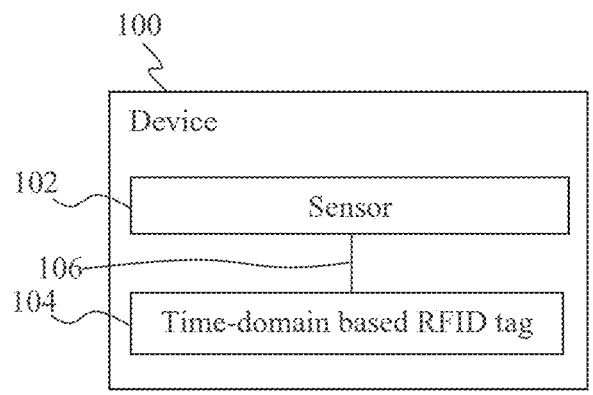
FIG. 1A shows a schematic view of a device being releasably couplable to an electric asset, according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Embodiments described in the context of one of the methods or devices are analogously valid for the other methods or devices. Similarly, embodiments described in the context of a method are analogously valid for a device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

In the context of various embodiments, the phrase "at least substantially" may include "exactly" and a reasonable variance.

In the context of various embodiments, the term "about" or "approximately" as applied to a numeric value encompasses the exact value and a reasonable variance.

As used herein, the term "and/or" includes any and all combinations of one or more of the associated listed items.

As used herein, the phrase of the form of "at least one of A or B" may include A or B or both A and B. Correspondingly, the phrase of the form of "at least one of A or B or C", or including further listed items, may include any and all combinations of one or more of the associated listed items.

As used herein, the expression "configured to" may mean "constructed to" or "arranged to".

Various embodiments provide a RFID-based sensing system for partial discharge (PD) detection and identification. For example, the system may be a chipless RFID-based sensing system. Various embodiments may also provide a vialess passive metamaterial (MTM)-based Quadrature Phase Shift Keying (QPSK) modulated chipless Radio Frequency Identification (RFID) tag being integrated with a PD sensor with the objective of PD detection and identification. Individual tags with the sensor may be mounted on specific electrical assets to be monitored. When interrogated by an external reader at 2.4 GHz, the tags respond with signals that contain the ID information and the state of the PD sensor. Any PD events detected may be traced back to the respective electrical assets that generate the PD emissions after a time-domain (TD) analysis, which allows prompt corrective action before the further degradation and premature failure of assets.

FIG. 1A shows a schematic view of a device 100 being releasably couplable to an electric asset, according to various embodiments. The device 100 may include a sensor 102 configured to detect partial discharge from the electric asset (not shown in FIG. 1A) and generate a pulsed signal representative of a presence or absence of the detected partial discharge; and a time-domain based RFID tag 104 electrically coupled to the sensor 102 (as denoted by line 106), the time-domain based RFID tag 104 configured to provide an ID code uniquely representative of a location of the device 100 when coupled to the electric asset. The device 100 may be configured to generate, upon interrogation by an external interrogator (not shown in FIG. 1A), a backscattered signal comprising the ID code and the pulsed signal, and the generated backscattered signal is to be read by an external reader (not shown in FIG. 1A).

In the context of various embodiments, the phrase "representative of" may interchangeably refer to as representing, associated with, or indicative of.

The phrase "electrically coupled" may mean directly or indirectly connected to, or provided as an electrical connection.

The phrase "ID code" refers to identity code or identification code.

In other words, PD detection in the near-field region is focused here. The sensor 102 may be in a preferred form of a RF sensing coil being mounted on the external shelf of the electrical asset. The EM wave associated with the PD generated within a power transformer may be detected by the coil mounted on its outer metallic surface. The placement of the coil is usually advised by the asset owner who has prior knowledge of the most probable PD source location. Also, the sensing coil may be designed based on the size of the available area and the necessary detection sensitivity. For examples, a 55 cm×80 cm coil may be mounted on a transformer surface, which may be about 15 cm away from the transformer windings to detect PD caused by degraded winding insulation and a 50-turn 32-cm narrow coil may be placed in a gap of the steel frame surface of a motor to detect PD due to degraded stator winding insulation. Since the EM wave is in the near-field region, the detected signal by the coil is in the range of hundreds of mV, which improves the signal-to-noise ratio of the PD detection. In addition, a tag may be integrated with the sensing coil so that each electrical asset has a unique identity (ID) for tracing the faulty asset should a PD event happened. By connecting the open-ended microstrip line output of each RFID tag to a sensing coil and mounting it directly on a suitable location of an electrical asset, it helps identify the faulty asset with high confidence.

To address the issues presented by the frequency-domain (FD) based chipless RFID approach, a time-domain (TD) based RFID tag (e.g. 104 of FIG. 1A) with a sensing coil is proposed. The TD based RFID tag may be chipped (i.e. chip-based) or chipless. In an example of the specific use of a TD based chipless RFID tag with the sensing coil, the following additional advantages may be provided: battery-less as the device receives its power wirelessly by an interrogator signal, good PD detection reliability because of near-field sensing and ability to differentiate PDs from different assets for faulty asset identification.

Unlike physical parameters such as pressure, humidity, temperature, gas or strain, PD is a transient event. Each PD event normally lasts for a duration of only hundreds of nanoseconds with a small signal level and a large trend of decay over time, unlike the physical parameters of pressure, humidity, temperature, gas or strain which does not change significantly over such a short period of time. Therefore, the capture of PD events requires the sensor to have high sensitive, fast response and a large enough hold time for the RFID tag to transmit the information to the reader. At the same time, the RFID reading cycle is required to be sufficiently short to ensure that the signal may be captured. Technical and co-operative considerations of both sensor (e.g. 102) and tag (e.g. 104) designs are required in achieving the device 100. In other words, the design considerations of the sensor (e.g. 102) and the tag (e.g. 104) cannot be made independently as two separate units and then simply integrate them together. Thus, the device 100 cannot be considered mere plug and play replacement derivable from existing parameter sensors with RFID tags. While there may be existing dedicated PD sensors in the current market to measure the PD waveform, such existing sensors are relatively expensive and are used mainly for scheduled maintenance check at the substation rather than large-scale deployment for continuous PD monitoring. The proposed device 100 is designed to detect the existence of PD events without capturing the detailed waveform, which eliminates the complex PD waveform receiving circuits, and may be produced in comparatively low cost, thereby making it an ideal choice for large-scale PD monitoring.

In one embodiment, the generated pulsed signal including a phase change may represent the presence of the detected partial discharge from the electric asset, and the generated pulsed signal including no change in phase may represent the absence of partial discharge detected from the electric asset. In another embodiment, the generated pulsed signal including a phase change may, vice versa, represent the absence of the detected partial discharge from the electric asset, and the generated pulsed signal including no change in phase may represent the presence of partial discharge detected from the electric asset.

In various embodiments, the sensor 102 may include at least one sensing coil for detecting the partial discharge; and at least one state-change component connected in parallel to the at least one sensing coil and operable to generate the pulsed signal. The at least one state-change component may include a non-linear component, for example but not limiting to, a fast response diode, a detector diode, a P-N junction diode, a Schottky barrier diode, a varactor/varicap diode, a bipolar junction transistor, a field effect transistor, or a memristor.

The sensor 102 may include a further sensing coil electrically coupled in series with the at least one sensing coil. The at least one sensing coil may be configured to operate at a first resonant frequency, and the further sensing coil is configured to operate at a second resonant frequency, the first resonant frequency being different from the second resonant frequency. In other words, the further sensing coil and the at least one sensing coil may be operating at different resonant frequencies.

The at least one sensing coil may include a plurality of sensing coils configured to operate at different resonant frequencies, each resonant frequency separated apart from another, and to provide an extended bandwidth for the sensor 102, the extended bandwidth being dependent on a spread of the different resonant frequencies.

In various embodiments, the time-domain based RFID tag 104 may include a delay line including one or more discontinuities, each discontinuity configured to provide one or more unique codes, wherein a unique code from the one or more discontinuities is used as the ID code. In some examples, each discontinuity may include one of the following: a split ring resonator, or a complementary split ring resonator, or a combination of a split ring resonator and a complementary split ring resonator. In other examples, the discontinuity may include one of: reconfigurable stub lines; or reconfigurable stub lines and a phase shifter. In a case of more than one discontinuity, each discontinuity may be arranged spaced apart from one another.

The delay line may be a composite right/left-handed transmission line.

The time-domain based RFID tag 104 may further include a power divider coupled to the discontinuity and arranged along the delay line in a manner such that the discontinuity may be indirectly coupled to the delay line through the power divider. The power divider may be configured to at least reduce excess signal reflection from the discontinuity, thereby ensuring only one signal reflection may be performed by the discontinuity.

A distal end of the delay line may be coupled to the sensor 102, thereby enabling a time lapse to be provided between the ID code and the pulsed signal.

The time-domain based RFID tag 104 may further include an antenna coupled to a proximal end of the delay line, the proximal end being opposite to the distal end. The antenna may be configured to receive an interrogation signal from the external interrogator. In this example, the antenna may be integrated within the time-domain based RFID tag 104.

In another example, the device 100 may include an antenna coupled in series with time-domain based RFID tag 104, the antenna configured to receive an interrogation signal from the external interrogator. The antenna, in this other example, may be external to the time-domain based RFID tag 104.

In various embodiments, the device 100 may further include at least one parameter sensor, each electrically coupled to a time-domain based RFID tag, which may be described in similar to the time-domain based RFID tag 104. The at least one parameter sensor may be configured to detect at least one parameter experienced by the electric asset for determining an abnormal change in the at least one parameter.

The time-domain based RFID tag 104 may be either a time-domain based chipped RFID tag, or be a time-domain based chipless RFID tag. Each time-domain based RFID tag electrically coupled to the at least one parameter sensor may be either a time-domain based chipped RFID tag, or be a time-domain based chipless RFID tag.

In one embodiment, wherein the time-domain based RFID tag 104 is a time-domain chipped based RFID tag, and the device 100 may further include at least one parameter sensor electrically coupled to the time-domain based chipped RFID tag 104. The at least one parameter sensor may be configured to detect at least one parameter experienced by the electric asset for determining an abnormal change in the at least one parameter. In other words, multiple sensors including the sensor 102 may be electrically coupled to a single time-domain chipped based RFID tag.

In various embodiments, the at least one parameter sensor may include at least one of: a temperature sensor, a humidity sensor, a vibration sensor, or a strain sensor.

Figure 1B:
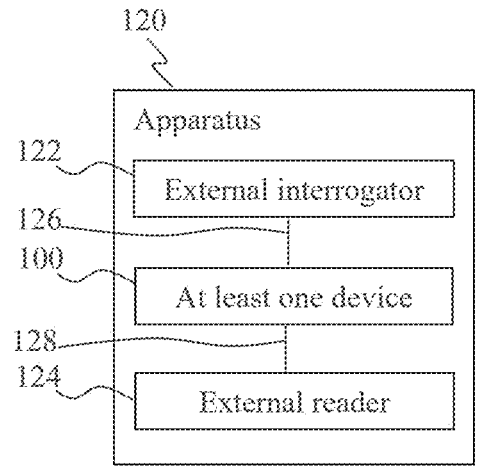
FIG. 1B shows a schematic view of an apparatus including at least one device of FIG. 1A, according to various embodiments.

FIG. 1B shows a schematic view of an apparatus 120, according to various embodiments. The apparatus 120 may include at least one device 100 according to various embodiments, each device 100 releasably couplable to each corresponding electric asset (not shown in FIG. 1B); an external interrogator 122 configured to interrogate the at least one device 100 to generate a backscattered signal; and an external reader 124 configured to read the backscattered signal to obtain identification of the corresponding electric asset and information on partial discharge experienced by the corresponding electric asset. The at least one device 100 may be in communication with the external interrogator 122 and external reader 124, as denoted by respective lines 126, 128.

The apparatus 120 may include the same or like elements or components as those of the device 100 of FIG. 1A, and as such, the like elements may be as described in the context of the device 100 of FIG. 1A, and therefore the corresponding descriptions may be omitted here.

In various embodiments, the external interrogator 122 and the external reader 124 may be integrated within a single external interrogator cum reader.

Figure 2:
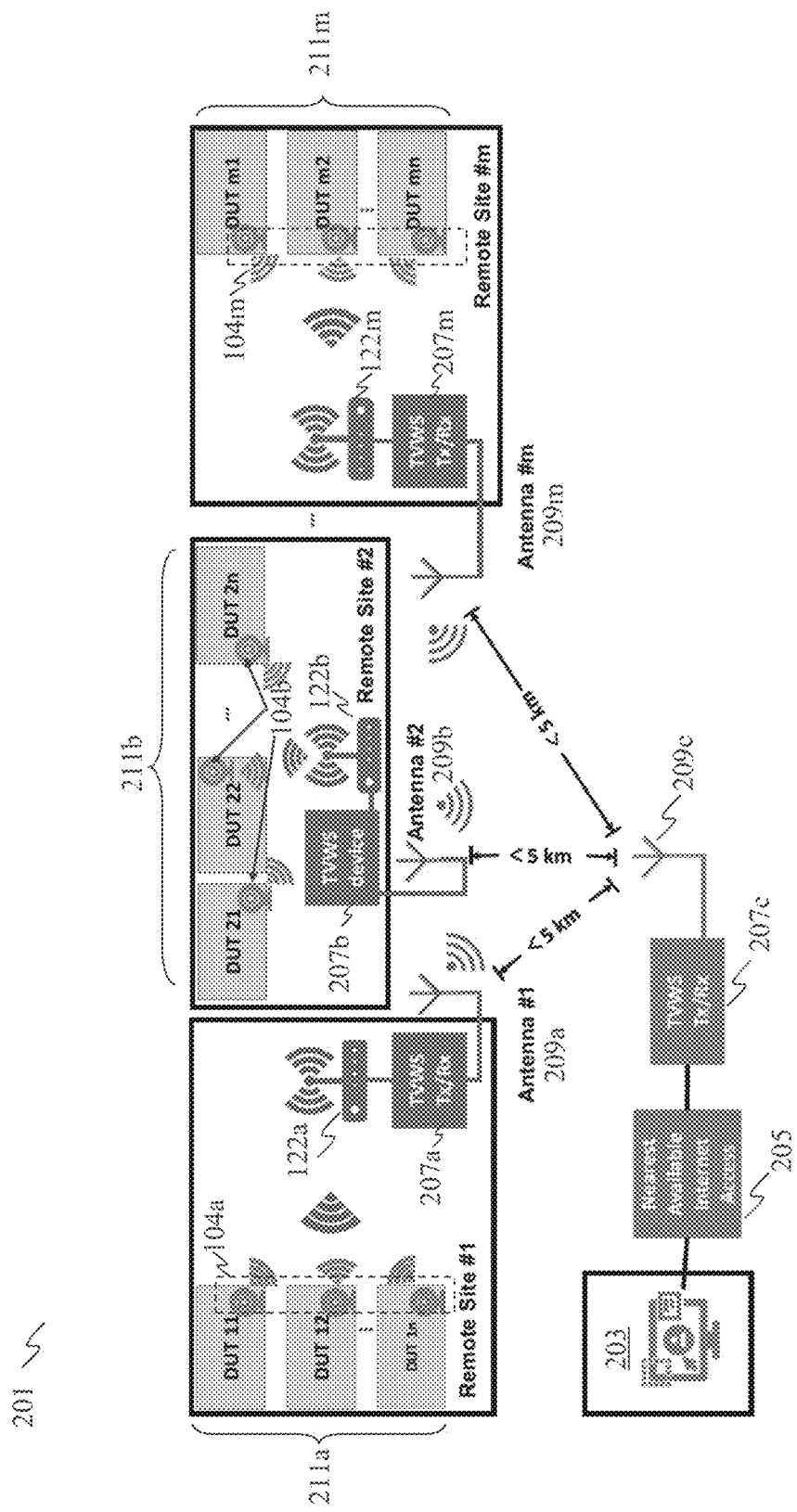
FIG. 2 shows a schematic illustration of an exemplary system architecture of chipless or chipped RFID based remote conditional monitoring, according to various embodiments.

An exemplary system architecture of chipless or chipped RFID based remote conditional monitoring, as seen in a schematic illustration 201 of FIG. 2 may include the apparatus 120 in accordance with various embodiments. In FIG. 2, there are m numbers of remote sites, denoted as Remote Site #1, Remote Site #2, . . . , Remote Site #m, and at each remote site, there may be n number of device-under-test, DUT 211a, 211b, 211m (for example at Remote Site #1, being denoted as DUT11, DUT12, . . . , DUT1n; at Remote Site #2, being denoted as DUT21, DUT22, . . . , DUT2n; at Remote Site #m, being denoted as DUTm1, DUTm2, . . . , DUTmn). Each DUT 211a, 211b, 211m may be an electric asset to which a device (e.g. 100) is mounted. Each device includes a RFID sensing tag 104a, 104b, . . . , 104m (described in similar context to the time-domain based RFID tag 104 in FIG. 1A). The RFID sensing tag 104a, 104b, . . . , 104m may be interrogated by respective RFID interrogator 122a, 122b, . . . , 122m (described in similar context to the external interrogator 122 of FIG. 1B) located at or near each remote site. Each RFID interrogator 122a, 122b, . . . , 122m, which may also be integrated with a reader (described in similar context to the external reader 124 of FIG. 1B), is in communication with a TV whitespace transmitter-receiver (TVWS Tx/Rx) 207a, 207b, . . . , 207m coupled to an antenna 209a, 209b, . . . , 209m. Each remote site may be located at a radius of about 5 km from a distant TVWS Tx/Rx 207c having an antenna 209c that transmits/receive signals to/from the remote sites. The distant TVWS Tx/Rx 207c may be in communication with a remote monitoring center 203 via any nearest available internet access 205. With such a system architecture, the remote monitoring center 203 may provide as a centralized unit to monitor whether partial discharge is being experienced by any DUT 211a, 211b, 211m, and if so, from which DUT 211a, 211b, 211m.

Figure 1C:
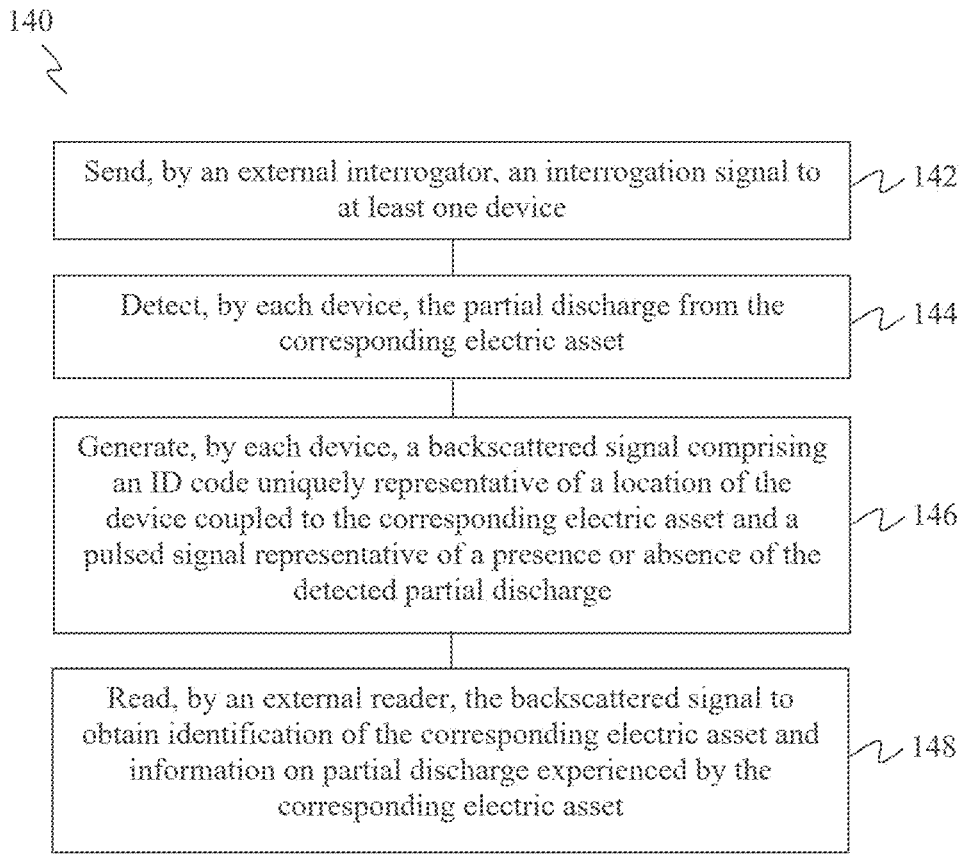
FIG. 1C shows a flow chart illustrating a method for obtaining identification of at least one electric asset and information on partial discharge experienced by the at least one electric asset, according to various embodiments.

FIG. 1C shows a flow chart illustrating a method 140 for obtaining identification of at least one electric asset and information on partial discharge experienced by the at least one electric asset, according to various embodiments. In FIG. 1C, at Step 142, an interrogation signal may be sent by an external interrogator (e.g. 122 of FIG. 1B) to at least one device (e.g. 100), each device 100 releasably coupled to each corresponding electric asset. At Step 144, the partial discharge from the corresponding electric asset may be detected by each device 100. At Step 146, a backscattered signal may be generated by each device 100. The backscattered signal may include an ID code uniquely representative of a location of the device 100 coupled to the corresponding electric asset and a pulsed signal representative of a presence or absence of the detected partial discharge. At Step 148, the backscattered signal may be read by an external reader (e.g. 124 of FIG. 1B) to obtain identification of the corresponding electric asset and information on partial discharge experienced by the corresponding electric asset.

The method 120 may include the same or like elements or components as those of the device 100 of FIG. 1A or the apparatus 120 of FIG. 1B, and as such, the same numerals are assigned and the like elements may be as described in the context of the device 100 of FIG. 1A or the apparatus 120 of FIG. 1B, and therefore the corresponding descriptions are omitted here.

In the step 146 of generating the backscattered signal, a state-change component of the device 100 may remain at a first state when substantially no partial discharge is detected such that the phase of the pulsed signal remains unchanged, and the state-change component may be turned to a second state by an induced pulsed voltage of the detected partial discharge to provide a phase change in the pulsed signal.

The way of detecting the induced pulsed voltage may be by detecting a change of resistance, R of the state-change component.

Figure 3:
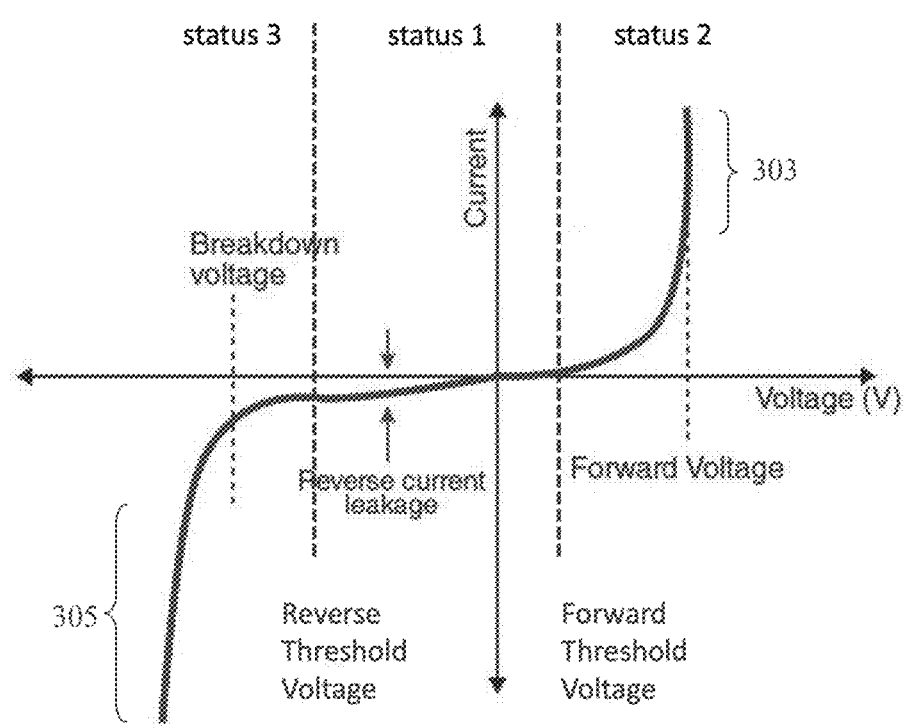
FIG. 3 shows a plot illustrating a Current-Voltage (I-V) curve of a state-change component, according to one embodiment.

The state-change component (e.g. a diode) may have a Current-Voltage (I-V) curve 301 as shown in FIG. 3. Typically, the voltage required to turn the diode on is called the forward voltage, which may be interchangeably referred to as the cut-in voltage or on-voltage. When a positive voltage across the diode is larger than or equal to the Forward Threshold Voltage, the diode starts to show a non-linear characteristic evidently and has the possibility to provide an impedance change. In the reverse direction, there is similarly a Reverse Threshold Voltage. When a negative voltage across the diode is larger than or equal to the Reverse Threshold Voltage, the diode also starts to show a non-linear characteristic evidently and has the possibility to provide an impedance change. As such, the I-V curve 301 may be separated into three parts based on the Forward Threshold Voltage and the Reverse Threshold Voltage, resulting in three statuses (Status 1, 2 and 3) as seen in FIG. 3. Status 1 may be considered as no impedance change since the I-V relationship is approximately linear and the impedance change may be negligible. The first state of the state-change component may refer to the operation under Status 1 situation. In status 2 and 3, the impedance may be considered as varying with the diode showing obvious non-linear characteristics. The second state of the state-change component may refer to the operation either under Status 2 situation or Status 3 situation. In an alternative, Status 2 and 3 may collectively be considered as an impedance changing status if, for example, two diodes are connected in parallel. The second state of the state-change component may then refer to the operation under this impedance changing status situation. Although the I-V relationship is approximately linear again at areas denoted by 303, 305 in FIG. 3, the operations at these voltages may still be referred to as the second state since impedance has changed from Status 1, and a phase shift compared to Status 1 may nevertheless be detected.

In an alternative vice versa embodiment, the state-change component may be arranged or configured in a manner such that when there is an induced pulsed voltage of the detected partial discharge (presence of PD event), the phase of the pulsed signal may remain unchanged; and when there is substantially no partial discharge (absence of PD event), a phase change in the pulsed signal may be provided.

In various embodiments, the step 144 of detecting the partial discharge may include capturing energy of the partial discharge over an extended bandwidth of a sensor (e.g. 102) of the device 100. The sensor 102 may include a plurality of sensing coils operating at different resonant frequencies, the extended bandwidth being dependent on a spread of the different resonant frequencies.

The device 100 may include a time-domain based RFID tag (e.g. 104) including a delay line, and the step 146 of generating the backscattered signal may include providing, by one or more discontinuities of the delay line, one or more unique codes; and using a unique code as the ID code. The step of providing the one or more unique codes may include generating the one or more unique codes based on phase shift keying modulations. The phase shift keying modulations may be one of: quadrature phase shift keying modulations, or 16 phase shift keying modulations.

In various embodiments, the method 140 may further include at least reducing, by a power divider, excess signal reflection from the discontinuity. The power divider may be electrically coupled to the discontinuity and arranged along the delay line in a manner such that the discontinuity is indirectly coupled to the delay line through the power divider.

The method 140 may further include receiving, by an antenna of the at least one device 100, the interrogation signal.

In various embodiments, the external interrogator 122 and the external reader 124 may be integrated within a single external interrogator cum reader.

The method 140 may further include detecting, by at least one parameter sensor of each device 100, at least one parameter experienced by the corresponding electric asset for determining an abnormal change in the at least one parameter. Each of the at least one parameter sensor may be electrically coupled to a time-domain based RFID tag (described in similar context to the time-domain based RFID tag 104 in FIG. 1A). In one example, the time-domain based RFID tag may be a time-domain based chipless RFID tag.

In another example, the time-domain based RFID tag may be a time-domain chipped based RFID tag, and the method 140 may further include detecting, by at least one parameter sensor of each device 100, at least one parameter experienced by the corresponding electric asset for determining an abnormal change in the at least one parameter. The at least one parameter sensor may be electrically coupled to the time-domain based chipped RFID tag.

While the method described above is illustrated and described as a series of steps or events, it will be appreciated that any ordering of such steps or events are not to be interpreted in a limiting sense. For example, some steps may occur in different orders and/or concurrently with other steps or events apart from those illustrated and/or described herein. In addition, not all illustrated steps may be required to implement one or more aspects or embodiments described herein. Also, one or more of the steps depicted herein may be carried out in one or more separate acts and/or phases.

Examples of the device 100 and the method 140 will be described below in further detail, more specifically in the context of a design of a chipless RFID tag with a sensing coil for PD detection and identification, and the performance of fabricated tags with sensors.

Design

A. System Overview

Figure 4:
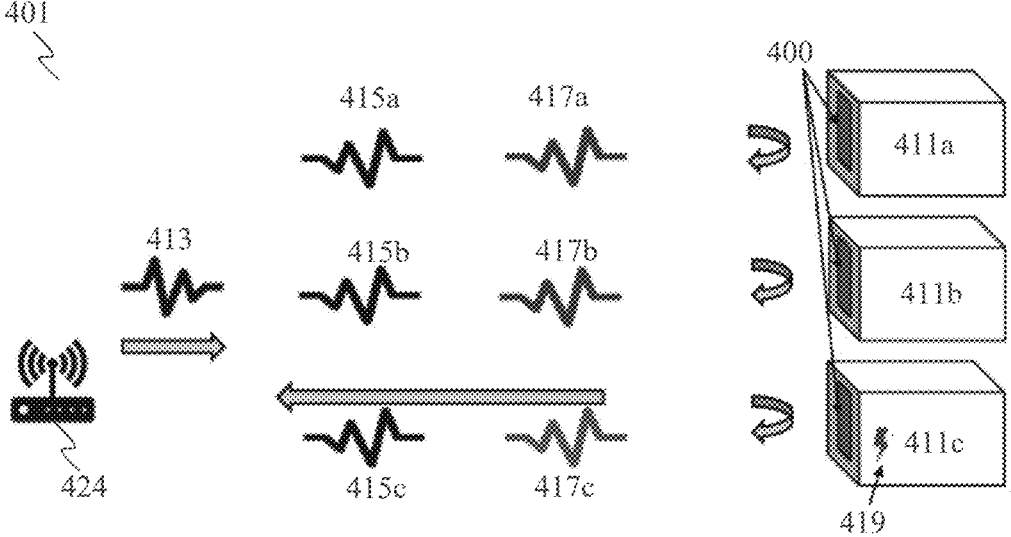
FIG. 4 shows an exemplary system overview of TD based chipless RFID tags with sensing coils for PD detection and source identification, according to various embodiments.

FIG. 4 shows an exemplary system overview 401 of TD based chipless RFID tags with sensing coils for PD detection and source identification. In FIG. 4, there is provided an interrogator cum reader 424 and several chipless RFID tags with sensors 400. Each tag with a sensor is mounted on an electrical asset 411a, 411b, 411c. The interrogator 424 sends a pulsed signal 413 periodically to all the tags, and their responses are received by the reader 424. The distinct ID codes 415a, 415b, 415c and sensed PD data 417a, 417b, 417c associated with the assets 411a, 411b, 411c are contained in the signals received by the reader 424 and processed through a host computer, which may be connected via the Internet for remote access (not shown in FIG. 4). When a PD event 419 occurs in a specific asset 411c, the sensed PD signal 417c and its corresponding ID code 415c are detected by the reader 424.

The system overview 401 may include the same or like elements or components as those of the device 100 of FIG. 1A and the apparatus 120 of FIG. 1B, and as such, the same ending numerals are assigned and the like elements may be as described in the context of the device 100 of FIG. 1A and the apparatus 120 of FIG. 1B.

B. Chipless RFID Tag Architecture

Figure 5A:
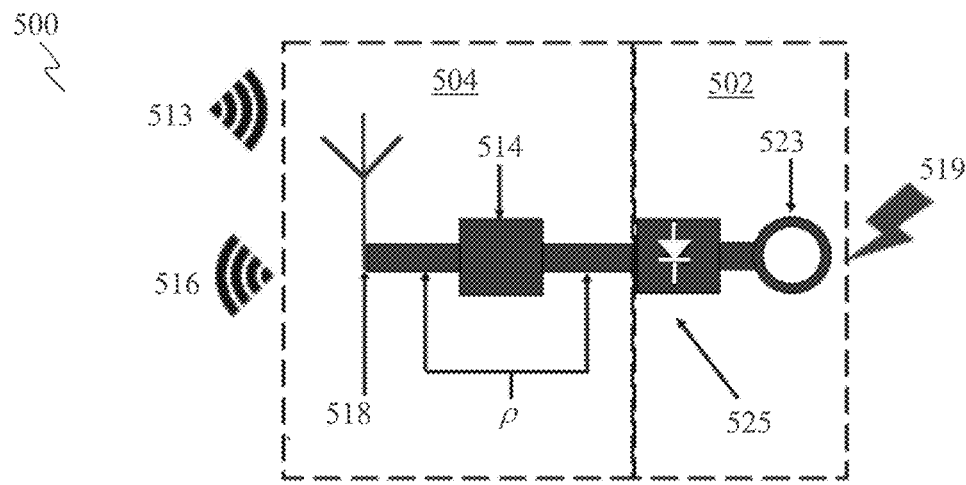
FIG. 5A shows a schematic view illustrating a proposed prototype of a chipless RFID tag based on the time-domain reflectometry (TDR) operating principle with a PD sensor, according to one embodiment.

FIG. 5A shows a schematic view illustrating a proposed prototype 500 of a chipless RFID tag 504 based on the time-domain reflectometry (TDR) operating principle with a PD sensor 502. The prototype 500 may include the same or like elements or components as those of the device 100 of FIG. 1A, and as such, the same ending numerals are assigned and the like elements may be as described in the context of the device 100 of FIG. 1A. There are three key components for the chipless RFID tag 504. The first component is an antenna 518 for communication with the interrogator (e.g. 122 of FIG. 1B) and the reader (e.g. 124 of FIG. 1B), not shown in FIG. 5. The second component is the delay line p to ensure sufficient time interval between the transmit signal 513 from the interrogator and the backscattered signal 516 received by the reader, which may be realized by composite right/left hand (CRLH) transmission lines (TLs). The third component is the discontinuity 514 that provides abrupt phase change to be used as unique ID information, which may be achieved using either a split ring resonator (SRR) or a complementary split-ring resonator (CSRR). Depending on the number of unique IDs required, different discontinuities may be designed to provide different phase changes. The tag 504 is connected to the PD sensor 502, which includes an RF coil 523 shunted with a diode 525, for detecting a PD event 519. As an illustration, the prototype 501 presented here has four different discontinuities to provide four unique IDs in the form of quadrature phase-shift keying (QPSK) modulation.

Figure 5B:
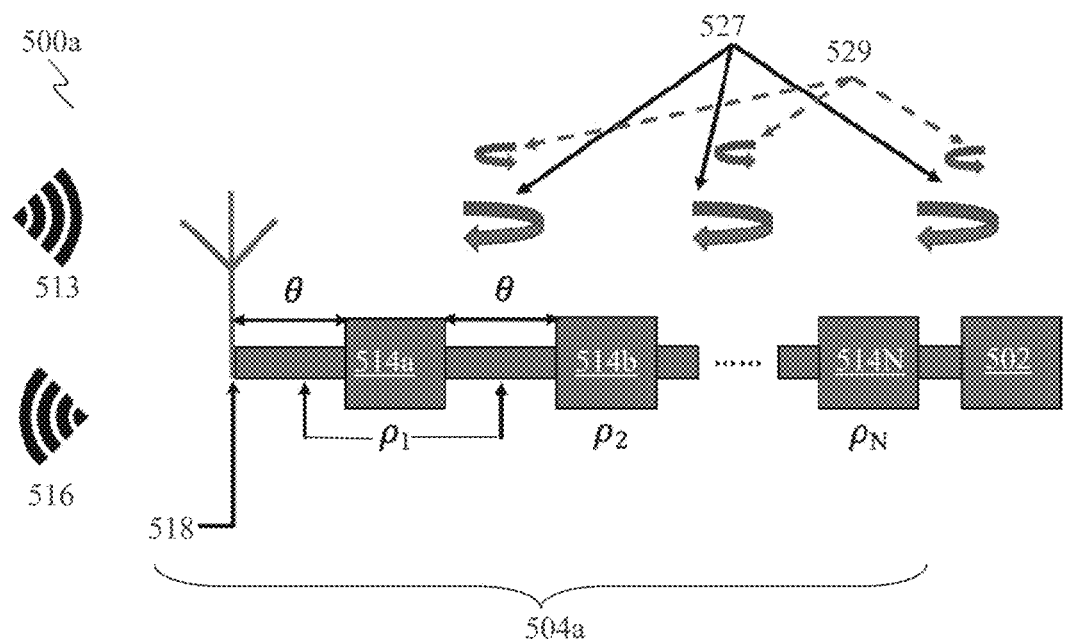
FIG. 5B shows a schematic view illustrating an architecture of a cascaded structure-based time-domain (TD) chipless RFID tag, according to one embodiment.

In another example, the chipless RFID tag 504 may be provided in a form of a cascaded structure-based TD chipless RFID tag 504a, the architecture 500a thereof being illustrated in FIG. 5B. The design is based on cascaded discontinuity 514a, 514b, ..., 514N (i.e. serially arranged reflectors, each spaced θ apart from an adjacent reflector) and delay lines or delay sections $\rho_1, \rho_2, \ldots, \rho_N$, that deliver the series reflected signals 527 as the time-domain (TD) response (e.g. the backscattered signal 516) of one interrogation 513. However, each reflector 514a, 514b, ..., 514N tends to reflect any signals, including those reflected by the backstage reflectors, and results in excessive reflected waves 529, as shown in FIG. 5B. This weakens the response signal (e.g. the backscattered signal 516) due to higher power consumption and waveform overlap.

Figure 5C:
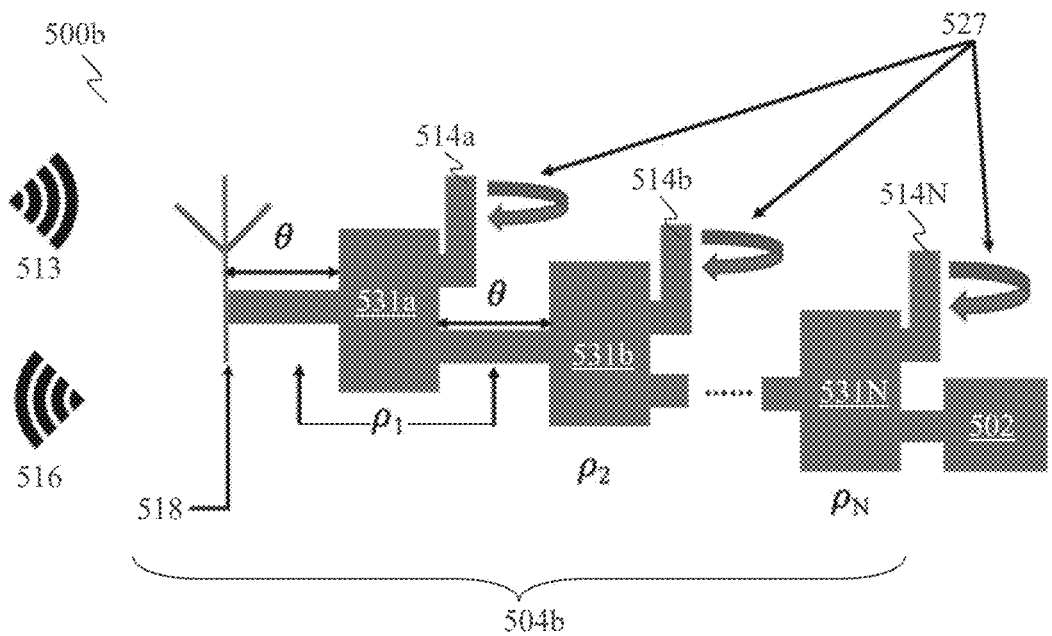
FIG. 5C shows a schematic view illustrating an architecture of a power divider-based TD chipless RFID tag, according to one embodiment.

To address this limitation, power dividers 531a, 531b, ..., 531N that may couple a defined amount of the signal power in a transmission line to a port enabling the signal to be used in another circuit may be introduced, as shown in FIG. 5C illustrating a schematic view of an architecture 500b of a power divider-based TD chipless RFID tag 504b. By doing so, excessive reflections (e.g. 529 as seen in FIG. 5B) may be eliminated or at least significantly reduced by breaking the direct cascade of reflectors 514a, 514b, ..., 514N and delay lines or delay sections $\rho_1$, $\rho_2$, ..., $\rho_N$ and ensuring only one reflection 527 is performed by each reflector 514a, 514b, ..., 514N.

C. Antenna

Figure 6A:
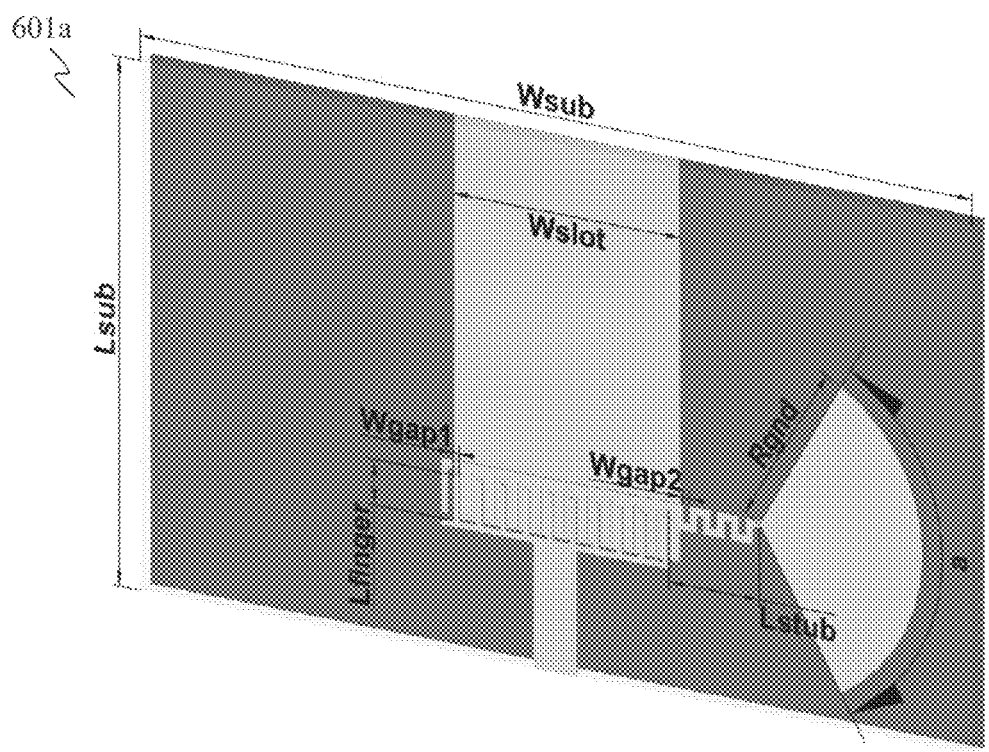
FIG. 6A shows a schematic perspective projection of a final structural dimensions of a zeroth-order resonator (ZOR) antenna, according to one embodiment.

The antenna is designed based on a vialess CRLH zeroth-order resonator (ZOR) operating at 2.4 GHz. The basic principle is to short one end of the CRLH transmission line (TL) to realize a ZOR resonator radiating with a broadside pattern. Given the operating frequency, the equivalent circuit and initial structure size are estimated and further fine tuning is performed using an EM solver (CST EM studio) so that the final structure size is obtained. FIG. 6A shows a schematic perspective projection 601a of the final structural dimensions of the ZOR antenna, which has an overall size of 35.75 mm ($W_{sub}$)×21.00 mm ($L_{sub}$) with a substrate thickness d=0.8128 mm. The circular segment along with the meandering path and the interlacing comb-like structure are on the top layer/surface of a substrate (of a PCB), while the dark area in FIG. 6A is on the bottom (or underlying) layer/surface being projected, visible at the top. The substrate material is Rogers RO4003 (relative permittivity, ∈r=3.38). Various dimensions of parts of the antenna are as in Table 1.

$$C_L = 2j\left(\omega\left(\omega\frac{\partial}{\partial\omega}(-1/Y_{21}) + 1/Y_{21}\right)\right) \quad \text{Equation (1)}$$

$$L_L = 2j\left(\omega\left(\omega\frac{\partial}{\partial\omega}(1/Z_{21}) - 1/Z_{21}\right)\right) \quad \text{Equation (2)}$$

$$C_R = C_r + 2C_p \quad \text{Equation (3)}$$

$$L_R = L_r + 2L_s \quad \text{Equation (4)}$$

$$C_G = \varepsilon_r\varepsilon_0 A/d \quad \text{Equation (5)}$$

where $$C_p = (Y_{11} + Y_{21})/(j\omega) \quad \text{Equation (6)}$$

$$L_s = (Z_{11} - Z_{21})/(j\omega) \quad \text{Equation (7)}$$

$$L_r = \left(\frac{\partial}{\partial\omega}(-1/Y_{21}) - j/(\omega^2 C_L)\right)/j \quad \text{Equation (8)}$$

$$C_r = \left(\frac{\partial}{\partial\omega}(1/Z_{21}) - j/(\omega^2 L_L)\right)/j \quad \text{Equation (9)}$$

Through Equations (1)-(5), $L_R$=5.305 nH, $C_R$=2.122 pF, $L_L$=1.1937 nH, $C_L$=0.8292 pF and $C_G$=3.7 pF. The antenna has an efficiency of −0.287 dB and a gain of 2 dBi at 2.4 GHz. The proposed design has achieved a 25.6% reduction in size as compared with the conventional design.

D. Delay Lines

The time delay provided by a CRLH TL operating in the left hand (LH) region is longer than the delay offered by a conventional right hand (RH) region TL. In order for the ID code and the PD sensor state to be differentiated, a time interval of at least 3 ns between the two is necessary. Hence,

TABLE 1

| Dimension | $L_{finger}$ (mm) | $W_{gap1}$ (mm) | $W_{gap2}$ (mm) | $L_{stub}$ (mm) | $R_{gnd}$ (mm) | $W_{sub}$ (mm) | $L_{sub}$ (mm) | $W_{slot}$ (mm) | a (degree) |
|---|---|---|---|---|---|---|---|---|---|
| Value | 1.80 | 0.25 | 0.25 | 0.30 | 4.00 | 35.75 | 21.00 | 9.75 | 120 |

Figure 6B:
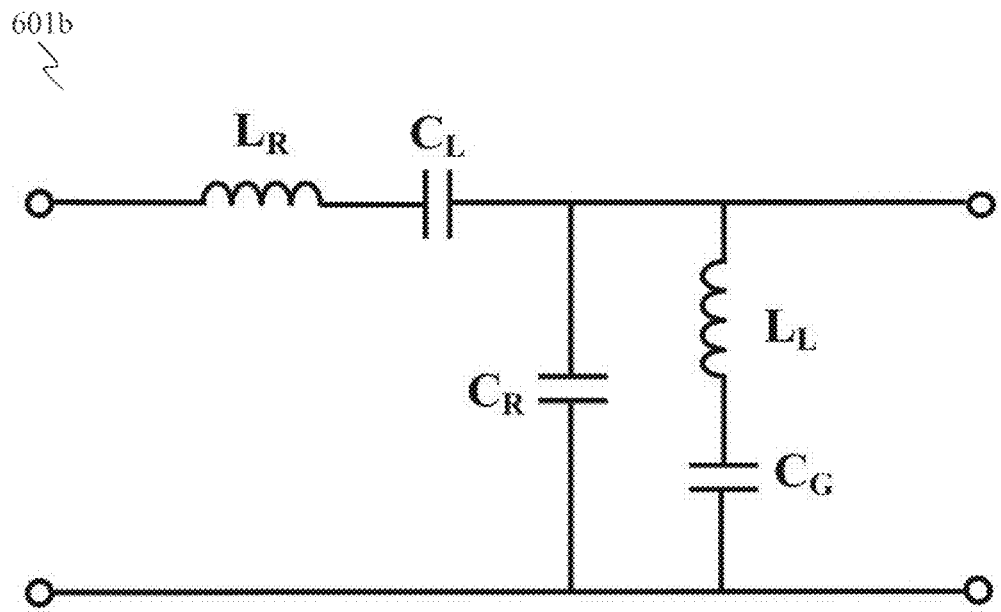
FIG. 6B shows the equivalent circuit of a composite right/left hand transmission line (CRLH TL), according to various embodiments.
Figure 7A:
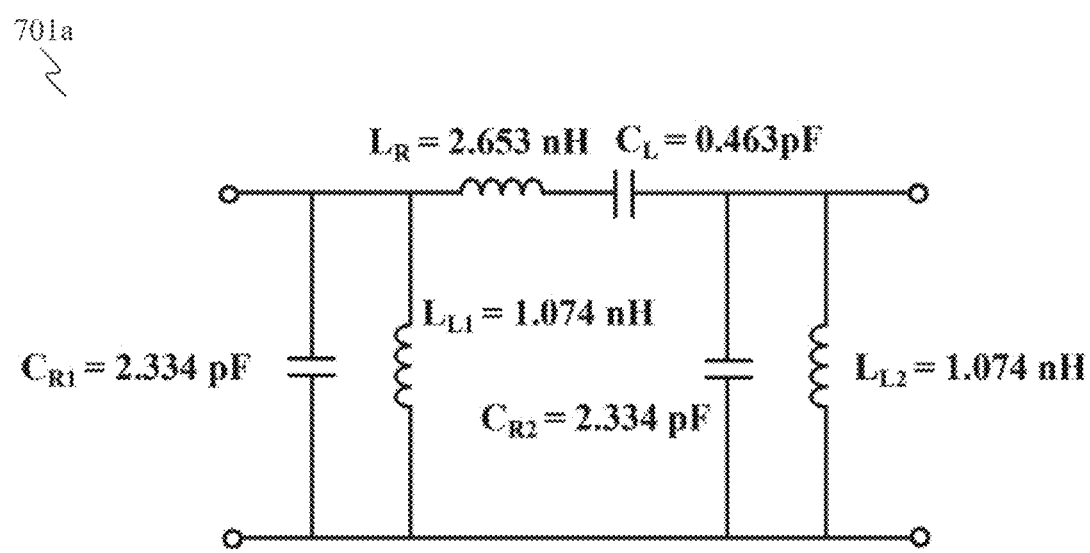
FIG. 7A shows the equivalent circuit of a unit cell of via-less CRLH delay line, according to one embodiment.

FIG. 6B shows the equivalent circuit 601b of a CRLH TL. The left-handed capacitance $C_L$ and inductance $L_L$ are realized by an interdigital structure and a meandering structure, respectively. The microstrip structure provides right-handed capacitance $C_R$ and inductance $L_R$ naturally. The conventional grounding via hole is now replaced by the capacitance $C_G$, which is realized by a large area fan patch. A slot in the antenna ground plane is added to achieve an omnidirectional radiation pattern. The two-port impedance and conductance parameters, $Z_{ij}$ and $Y_{ij}$ (i, j=1, 2) of the structure at the operating frequency are obtained from the full-wave simulation and then the respective equivalent capacitances and inductances are computed using Equations (1)-(5), where A is the area of grounding capacitance patch and d is the substrate thickness.

a CRLH TL operating in the LH region at 2.4 GHz is designed with three via-less CRLH unit cells to achieve the required time delay with minimum size. The equivalent circuit 701a of a unit cell of via-less CRLH delay line is shown in FIG. 7A. Similarly, the respective final values of the inductances and capacitances may be computed using Equations (1)-(4) based on the unit cell structure dimensions given in Table 2 below.

TABLE 2

| Dimension | $W_{int}$ (mm) | $W_{end}$ (mm) | $W_{gap}$ (mm) | $L_{stub1}$ (mm) | $L_{stub2}$ (mm) | $W_{finger}$ (mm) | $L_{finger}$ (mm) | $W_{stub}$ (mm) | $L_0$ (mm) | $L_1$ (mm) | $L_2$ (mm) | $L_3$ (mm) | $L_4$ (mm) | b (degree) |
|---|---|---|---|---|---|---|---|---|---|---|---|---|---|---|
| Value | 3.80 | 0.20 | 0.20 | 4.95 | 5.49 | 0.20 | 3.53 | 0.75 | 1.69 | 0.5 | 0.81 | 1.41 | 2.04 | 135 |

Figure 7B:
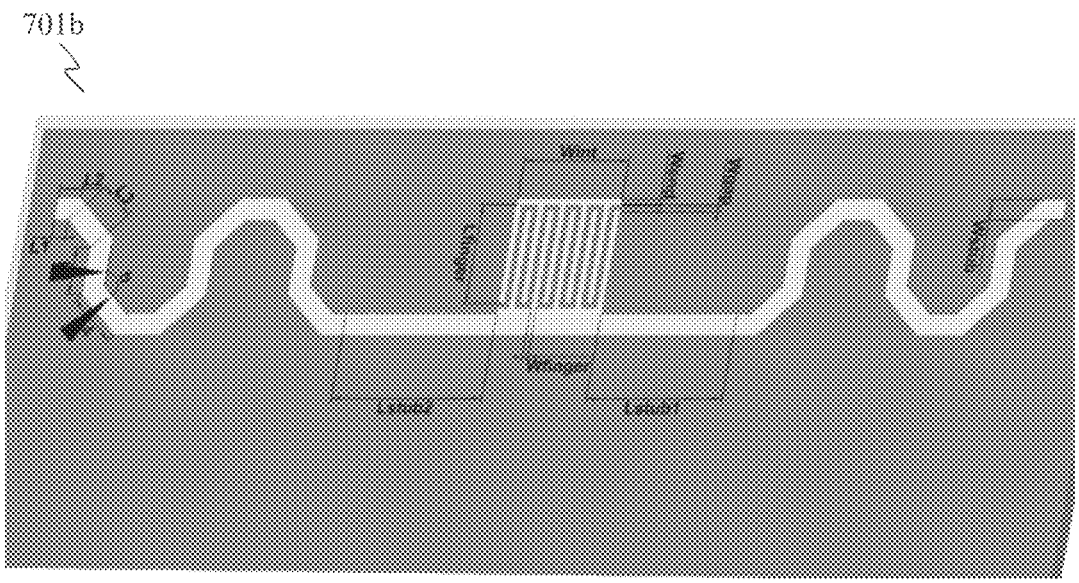
FIG. 7B shows a schematic perspective view of a unit cell of the CRLH delay line, according to one embodiment.
Figure 8:
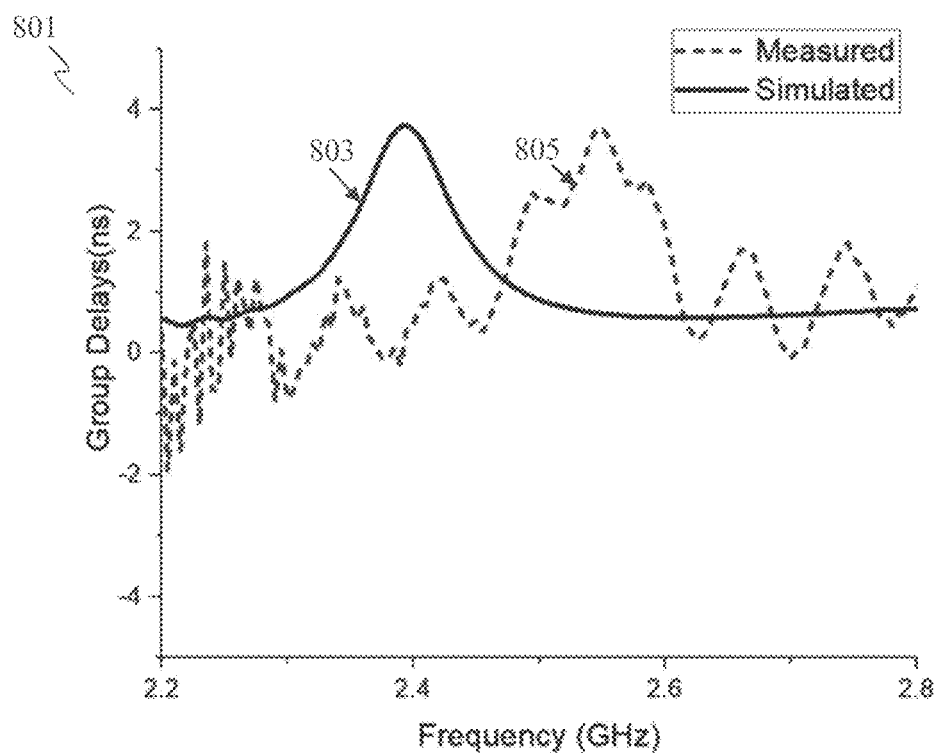
FIG. 8 shows a plot illustrating the relationship between group delays and frequency of CRLH delay line of FIG. 7B.

FIG. 7B shows a schematic perspective view 701b of a unit cell of the CRLH delay line, according to one embodiment. The final delay line may be realized with 3-unit cells, each of which provides 1.2 ns time delay at 2.4 GHz. The proposed design has reduced the size of the final delay line by 33.3% compared with the conventional TL design. The simulated time delays 803 and measured time delays 805 versus frequency are shown in a plot 801 of FIG. 8 illustrating the relationship between group delays and frequency of CRLH delay line of FIG. 7B. The measurement result has shown an upwards shift of 0.15 GHz as compared with the simulated result, which is about 6.25% error that may be contributed by fabrication tolerance. The measured resonant frequency is 2.55 GHZ, and a 3.67 ns time delay is achieved.

E. Discontinuities for Phase Changes

Four phase modulating sections with unique reflection coefficients are designed with split ring resonators (SRRs) and complementary split ring resonators (CSRRs) to provide the four ID codes of the four tags. SRR is a structure that essentially consists of a pair of concentric ring conductors etched on a dielectric substrate with slots etched on opposite sides. CSRR is a dual structure of an SRR of which the pair of concentric split ring slots are etched on the ground layer. The equivalent circuit of a CSRR is almost equivalent to shift the components in the dual SRR equivalent circuits from series to parallel and keeping the values unchanged. SRR and CSRR structures are able to provide an effective LH region that is necessary for a distinct and abrupt phase change. For a given structure size, the range of resonant frequency and the impedance of the resonant circuit of SRR and CSRR is rather limited. If all of the four discontinuities are realized solely by either SRR or CSRR, the size differences among the four sections may be challenging to achieve the compactness.

Figure 9A:
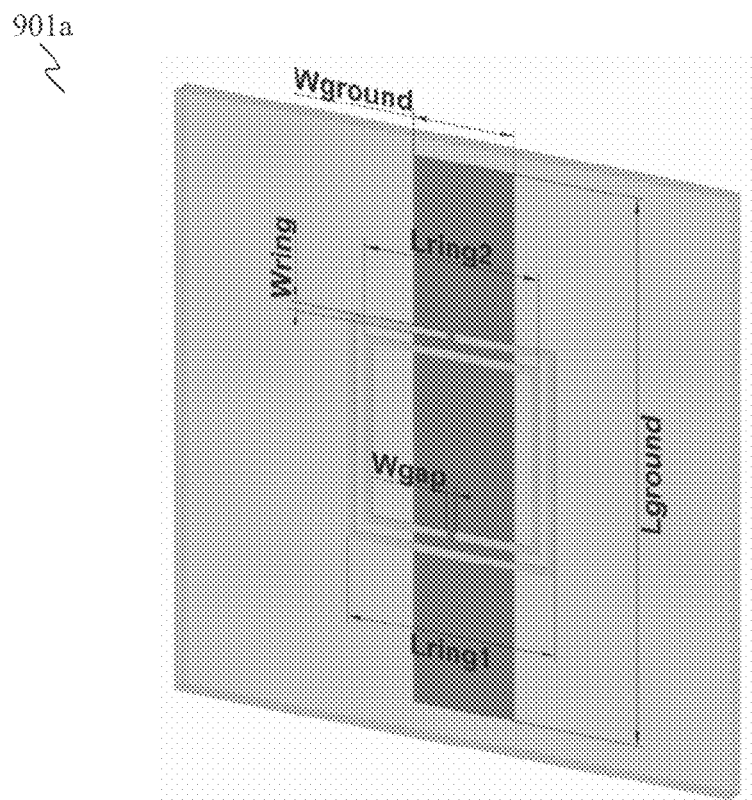
FIG. 9A shows a schematic perspective projection of a structure of a square split ring resonator (SRR), according to one embodiment.
Figure 9B:
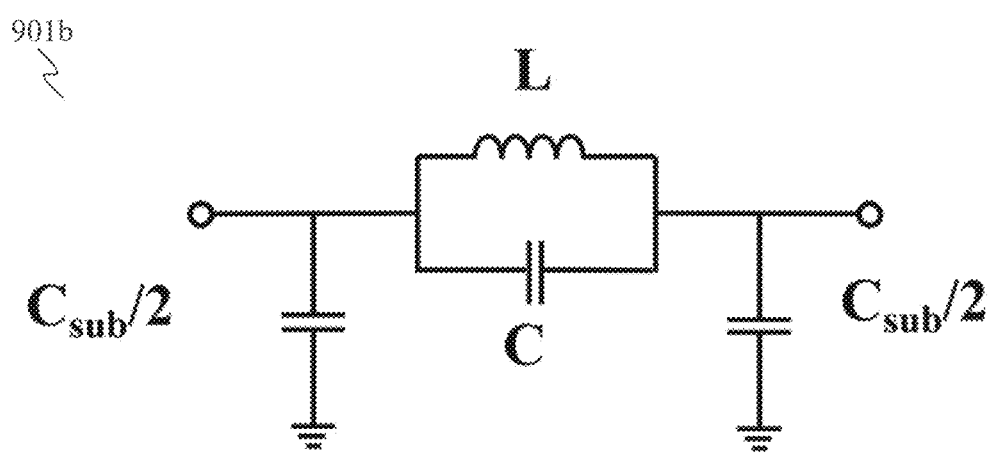
FIG. 9B shows the equivalent circuit of the SSR, according to various embodiments.

To provide 4 distinct phases with compact size, both SRR and CSRR structures are used, and the initial dimensions of the rings are estimated and fine-tuned using EM solver. The SRR structure 901a and its equivalent circuit 901b are shown in FIG. 9A and FIG. 9B, respectively. As seen in FIG. 9A, the SSR 901a is provided on the ground plane (dark rectangular area) that has $L_{ground}$ being about 20.40 mm and $W_{ground}$ being about 4.08 mm. While the SRR structure 901a is shown to be of a squarish shape, the structure may also take other shapes.

Figure 10A:
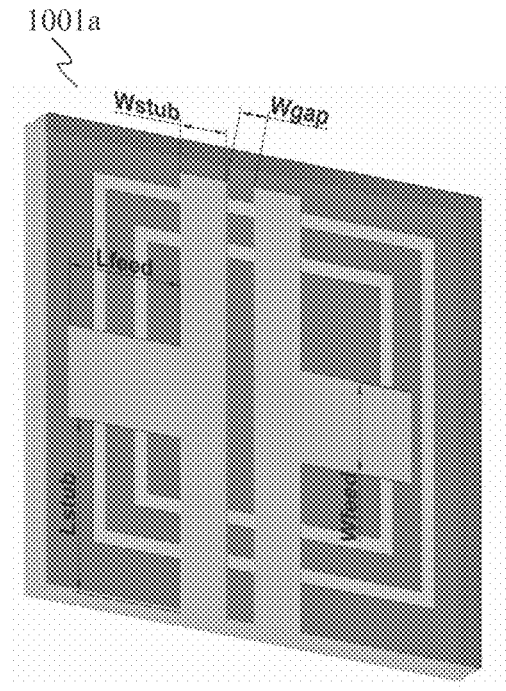
FIG. 10A shows a schematic perspective projection of a structure of a complementary split ring resonator loaded with capacitive stub (CSRR1), according to one embodiment.
Figure 10B:
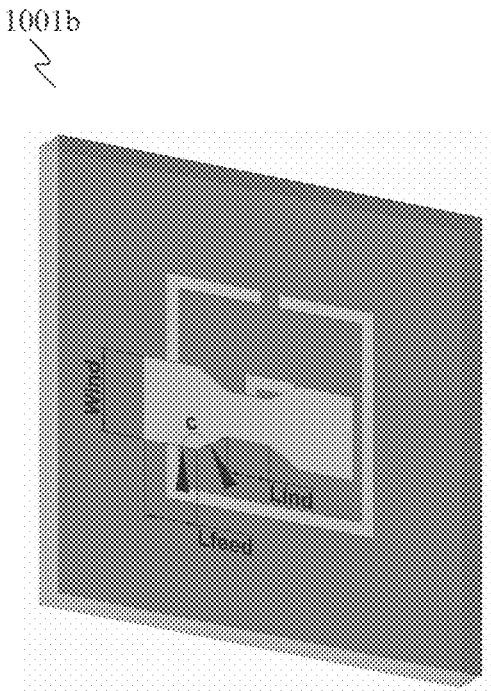
FIG. 10B shows a schematic perspective projection of a structure of a complementary split ring resonator loaded with inductive microstrip line (CSRR2), according to one embodiment.
Figure 10C:
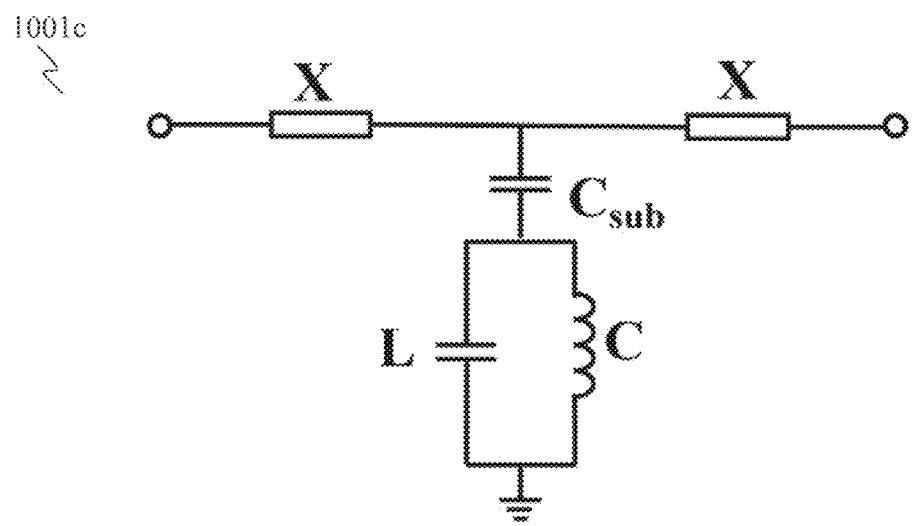
FIG. 10C shows the equivalent circuit of the complementary split ring resonator of FIG. 10A or 10B.

The CSRR is the dual structure of the SRR, which essentially consists of a pair of concentric ring gaps etched on ground plane excluding a small segment conductor on opposite sides. To provide −45° and 45° phase shifts, two CSRRs loaded with different structures 1001a, 1001b are shown in FIG. 10A and FIG. 10B, respectively; and their equivalent circuit 1001c is given in FIG. 10C. Table 3 shows dimensions of the CSRR loaded with capacitive stub (CSRR1). The CSRR is provided on the ground plane on the top surface of the substrate, while the capacitive stub is provided on the bottom surface of the substrate, and being projected to the top as seen in FIG. 10A.

TABLE 3

| Dimension | $L_{feed}$ (mm) | $W_{feed}$ (mm) | $W_{stub}$ (mm) | $W_{gap}$ (mm) | $L_{stub}$ (mm) |
| --- | --- | --- | --- | --- | --- |
| Value | 2.43 | 1.84 | 1.00 | 0.60 | 3.50 |

Table 4 shows the dimensions of the CSRR loaded with inductive microstrip line (CSRR2). The CSRR is provided on the ground plane on the top surface of the substrate, while the inductive microstrip line is provided on the bottom surface of the substrate, and being projected to the top as seen in FIG. 10B.

TABLE 4

| Dimension | $L_{feed}$ (mm) | $W_{feed}$ (mm) | $L_{ind}$ (mm) | $W_{ind}$ (mm) | c (degree) |
| --- | --- | --- | --- | --- | --- |
| Value | 1.27 | 1.84 | 1.00 | 1.00 | 150 |

For the QPSK modulation, 4 phase shifts, namely 135°, −135°, −45° and 45° are designed using two SRRs and two CSRRs with their dimensions given in Table 5.

TABLE 5

| Structure | SRR1 | SRR2 | CSRR1 | CSRR2 |
| --- | --- | --- | --- | --- |
| Phase change (degree) | 135 | −135 | 45 | −45 |
| Lring1 (mm) | 8.4 | 5.15 | 7.45 | 5 |
| Lring2 (mm) | 7 | 2.15 | 5.65 | 1.2 |
| Wring (mm) | 0.3 | 0.3 | 0.3 | 0.3 |
| Wgap (mm) | 0.4 | 0.4 | 0.3 | 0.4 |

With the designed SRRs and CSRRs, the four tags can provide QPSK modulation with four distinct phase changes: 135°, −135°, −45° and 45°. The respective values of the circuit elements of the two SRRs and the two CSRRs are determined and listed in Table 6.

TABLE 6

| Structure | SRR1 | SRR2 | CSRR1 | CSRR2 |
| --- | --- | --- | --- | --- |
| L (nH) | 10 | 2.0837 | 2.1628 | 1.7143 |
| C (pF) | 0.901 | 0.9505 | 0.9132 | 0.5 |
| Csub (pF) | 0.614 | 2.178 | 3.0248 | 0.6339 |
| Series reactance | Not Applicable | Not Applicable | 3.0248 pF | 2.3123 nH |

Figure 11:
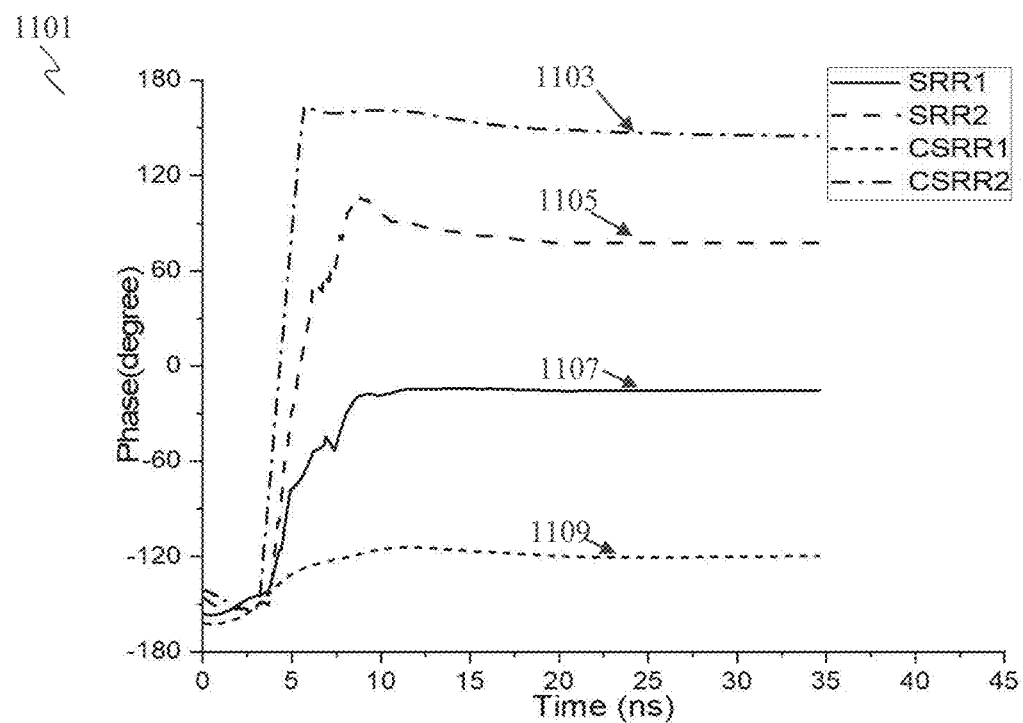
FIG. 11 shows a plot illustrating the relation of simulated phase shifts versus time for the 4 modulating sections with delay lines, according to various embodiments.

The simulation results of the signal phase from 0 to 10 ns of the four phase modulating sections connected with the CRLH delay lines are shown in a plot 1101 of FIG. 11. The simulated phase changes for SRR1 1107, SRR2 1105, CSRR1 1109 and CSRR2 1103 are 136.26°, −123.5°, 43.2° and −46.7°, respectively; which indeed provide four distinct phase changes.

The above discussion focuses on four different open-ring resonators deployed to produce four phase shifts as four symbols to achieve a Quadrature Phase Shift Keying (QPSK) that gives four unique IDs, which may be rather limited for larger-scale practical applications. It may also not be easily modifiable once the tag is fabricated on a printed circuit board (PCB). Further, the reflection phase of resonator may be highly sensitive to size, which requires a few design iterations to fine-tune the reflection phase.

Figure 12A:
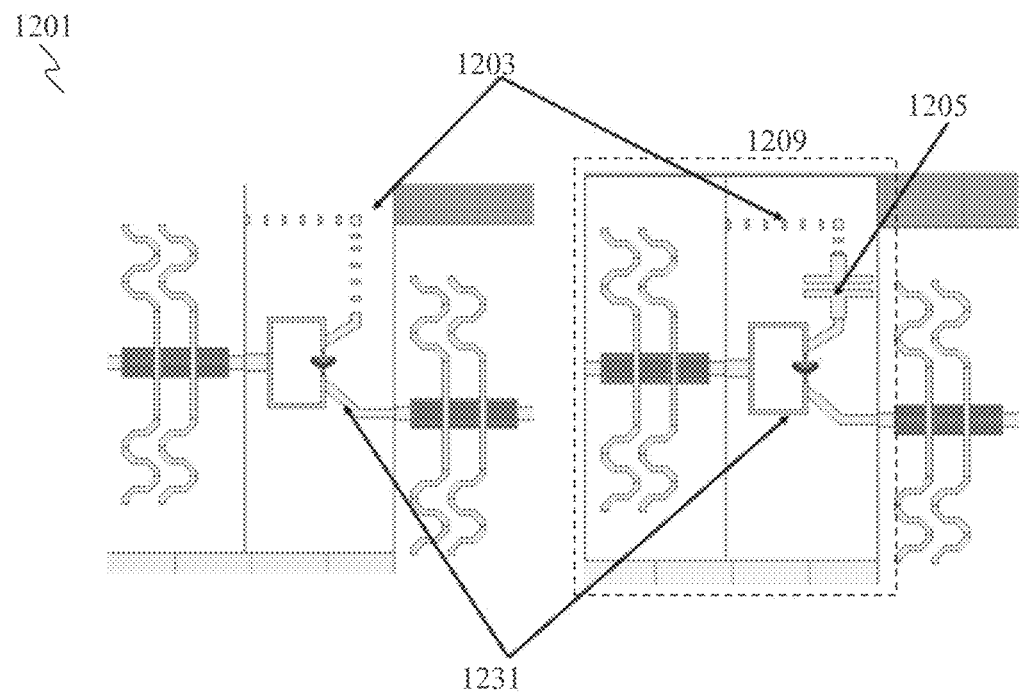
FIG. 12A shows a schematic representation of a design adopting reconfigurable stub lines and phase shifter, with two apparent delay sections, according to one embodiment.

In an alternative, a reconfigurable chipless RFID tag design may be considered. to increase the number of unique IDs. More specifically, the design adopts reconfigurable stub lines 1203 and phase shifter 1205, as shown in a schematic representation 1201 of FIG. 12A. In FIG. 12A, power dividers 1231 are employed.

Figure 12B:
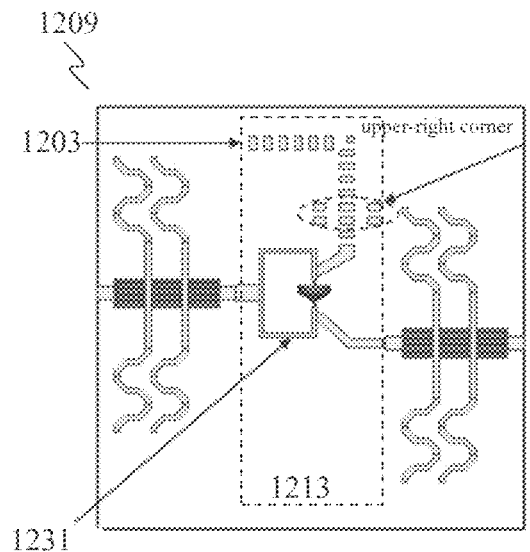
FIG. 12B and FIG. 12C show respectively an expanded top view and the corresponding bottom view of one delay section of FIG. 12A.
Figure 12C:
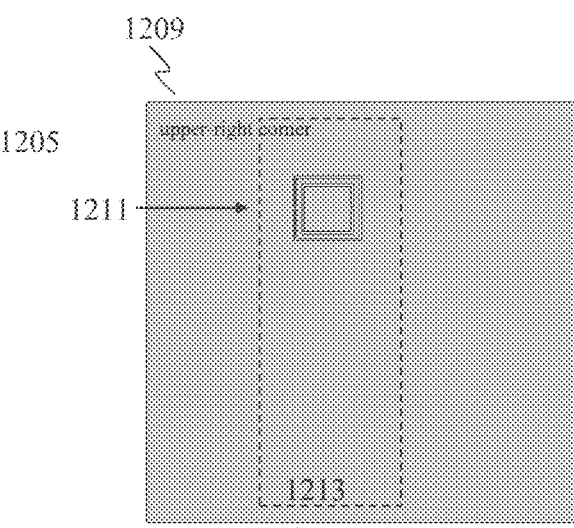
Figure 12D:
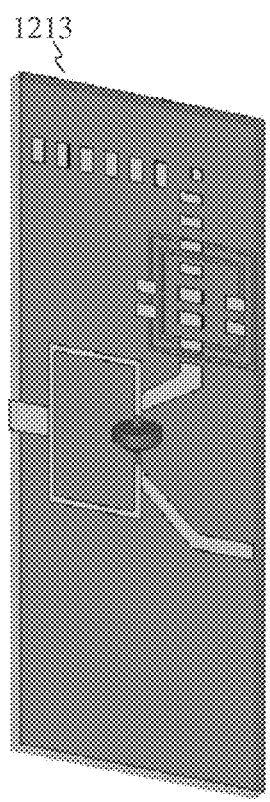
FIG. 12D, FIG. 12E and FIG. 12F show respectively a perspective cut-out projection, the cut-out top view and the corresponding bottom view of a power divider with unadjusted reconfigurable stub lines of FIG. 12B.
Figure 12E:
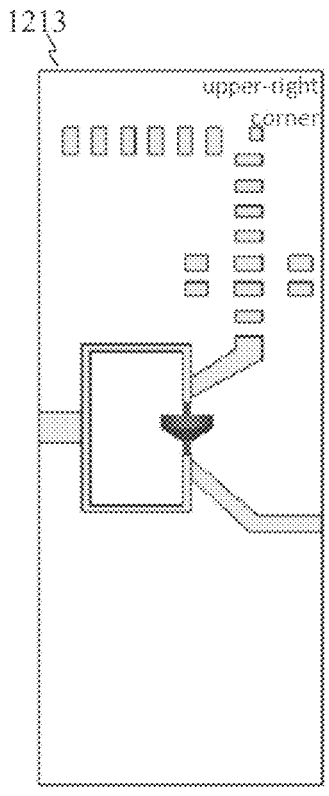
Figure 12F:
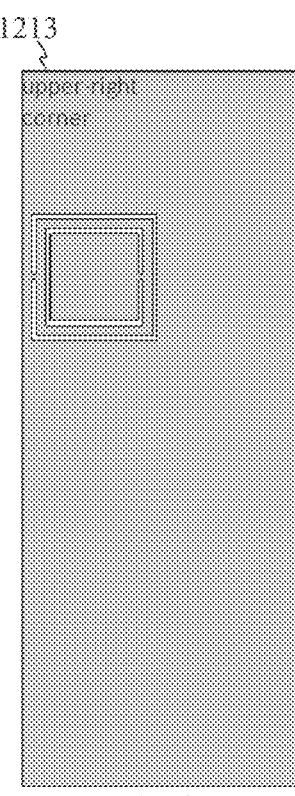

FIG. 12B and FIG. 12C show respectively an expanded top view and the corresponding bottom view of an area 1209 of FIG. 12A, that provides structures of the power divider-based chipless RFID tag with unadjusted reconfigurable stub lines reflectors fabricated on a substrate. The indication of "upper-right corner" in FIG. 12B marks a corner that is the same when viewed from the bottom in FIG. 12C. The power divider 1231, the phase shifter 1205 and reconfigurable stub lines 1203 are provided on the top surface of the substrate (of a PCB). The phase shifter 1205 is loaded with a CSRR 1211 that is provided on the bottom surface of (or underneath) the substrate. In other words, the location of the CSRR 1211 is arranged in alignment to (or overlaps) the location of the phase shifter 1205. For clearer visualization, FIG. 12D, FIG. 12E and FIG. 12F show respectively a perspective cut-out projection, the cut-out top view and the corresponding bottom view of an area 1213 of FIGS. 12B and 12C.

Figure 13:
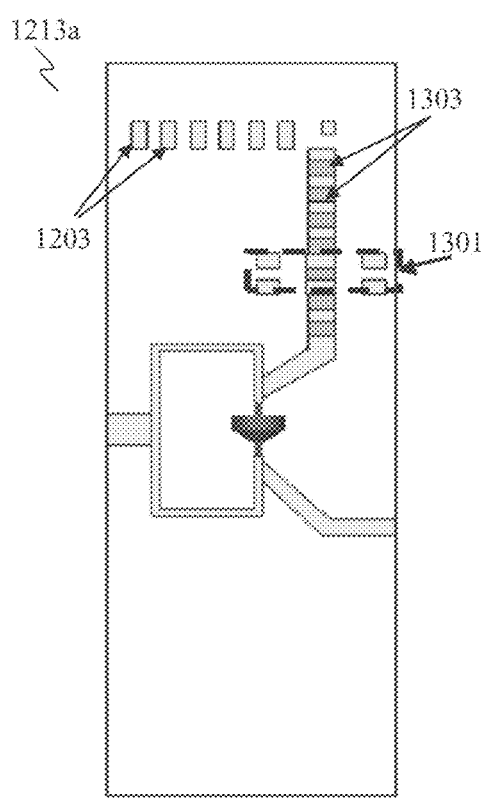
FIG. 13 shows a cut-off top view of a power divider with reconfigurable stub line being soldered to provide phase, according to one embodiment, where the phase shifter is disabled.

FIG. 13 shows a cut-off top view (similar to 1213 of FIG. 12E) of a power divider with reconfigurable stub line being soldered at 1303 to provide phase, according to one configuration 1213a, where the phase shifter denoted by the dotted square 1301 is disabled.

Figure 14:
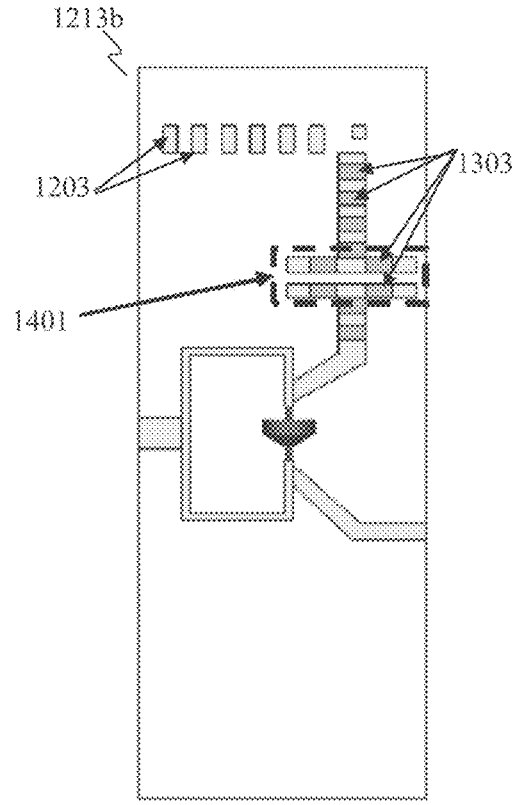
FIG. 14 shows a cut-off top view of a power divider with reconfigurable stub line being soldered to provide phase, according to one embodiment, where the phase shifter is enabled having additional conductors soldered.

FIG. 14 shows a cut-off top view (similar to 1213 of FIG. 12E) of a power divider with reconfigurable stub line being soldered at 1303 to provide phase, according to another configuration 1213b, where the phase shifter denoted by the dotted square 1401 is enabled by having additional conductors with the dotted square 1401 soldered at 1303.

Figure 15:
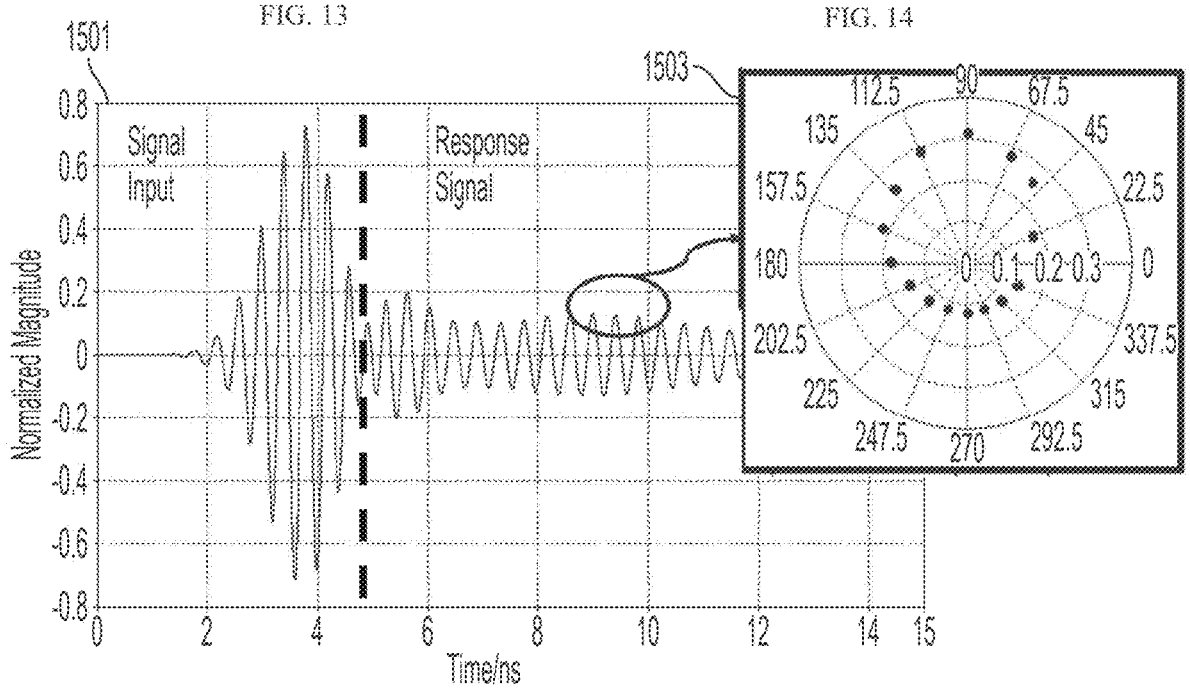
FIG. 15 shows time-domain signals of a TD chipless RFID tag with 16PSK modulation, with insert being the polar plot, according to one embodiment.

With this reconfigurable design, sixteen symbols may be realized with sixteen Phase Shift Keying (16PSK) modulations, as shown in the representation 1501 of FIG. 15. FIG. 15 shows time-domain signals of a TD chipless RFID tag with 16PSK modulation, and its insert 1503 being the polar plot. Hence, the number of unique IDs has increased from four (for the initial design, e.g. in FIGS. 9A, 10A, and 10B) to sixteen (for the reconfigurable design, e.g. in FIG. 12A).

Figure 16A:
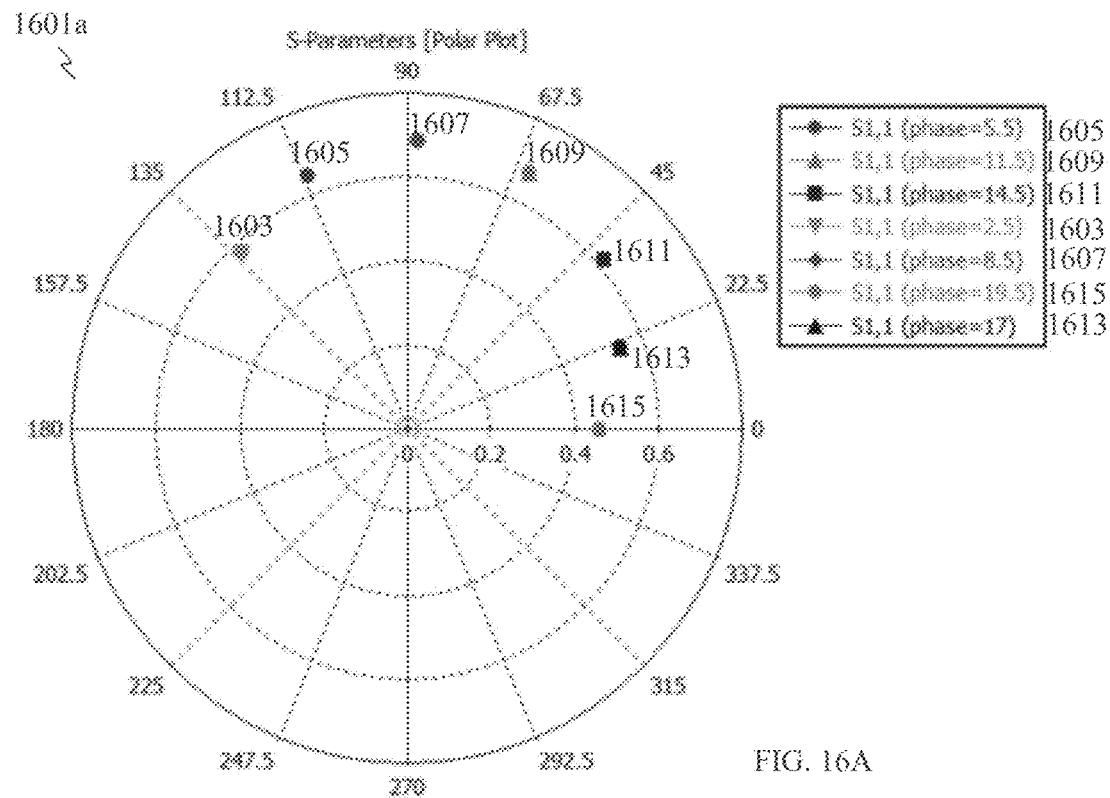
FIG. 16A shows a polar plot depicting phase shifts of reflector without phase shifters, according to one embodiment.
Figure 16B:
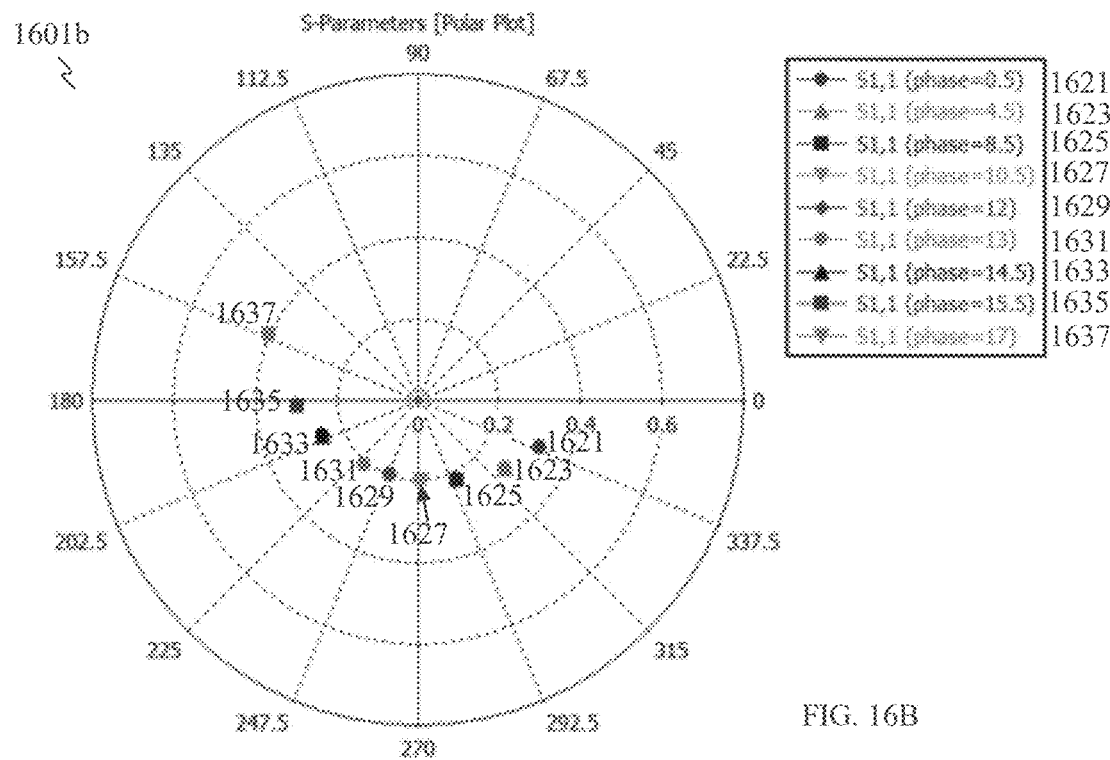
FIG. 16B shows a polar plot depicting phase shifts of reflector with a phase shifter, according to one embodiment.

A reconfigurable stub line includes several segments. By connecting different segments together (e.g. by soldering), the stub line may have different phase shifts in reflected signals, as shown in a polar plot 1601a of FIG. 16A depicting phase shifts (1603, 1605, 1607, 1609, 1611, 1613, 1615) of reflector without phase shifters. By using a 90-degree phase shifter, it provides additional phase changes, as shown in a polar plot 1061b of FIG. 16B depicting phase shifts (1621, 1623, 1625, 1627, 1629, 1631, 1633, 1635, 1637) of reflector with a phase shifter. Hence, a total of sixteen phases of reflected signals is achieved by using only two reconfigurable structures. At the same time, the label is modifiable to a certain degree.

The discontinuities described in this section E may include the same or like elements or components as those of the device 100 of FIG. 1A, and as such, the like elements may be as described in the context of the device 100 of FIG. 1A.

F. PD Sensor

Figure 17:
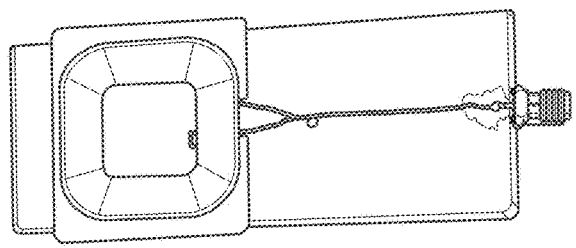
FIG. 17 shows a photograph of an initial designed coil prototype, according to one embodiment.

An initial designed coil is shown in a photograph 1701 of FIG. 17, where it has only a single coil with one resonant frequency and therefore limited bandwidth. As the electromagnetic emission associated with partial discharge (PD) is a wideband in nature, a narrow bandwidth captures only partial energy of the PD signal.

Figure 18:
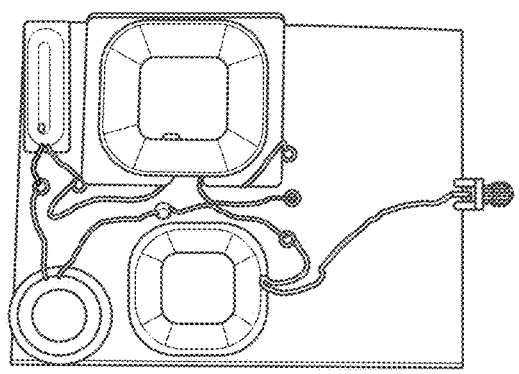
FIG. 18 shows a photograph of a multi-band coil prototype, according to one embodiment.

To address this limitation with enhanced PD detection sensitivity, a multi-band coil as shown in a photograph 1801 of FIG. 18 is designed to widen the sensing coil's bandwidth. It includes four coils that operate at different resonant frequencies separated apart. This design extends the bandwidth of the overall PD sensing so that the captured energy of the PD signal becomes higher, which translates to better detection sensitivity. The coils may be of different shapes and sizes.

Figure 19:
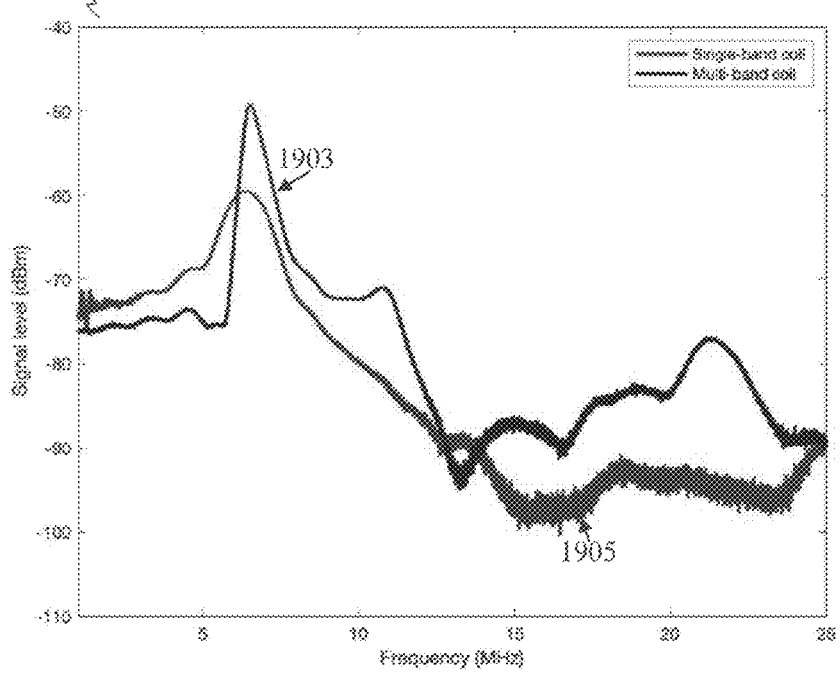
FIG. 19 shows a comparison plot depicting power spectrum of PD signal captured by the two different sensing coil designs of FIGS. 17 and 18.
Figure 20:
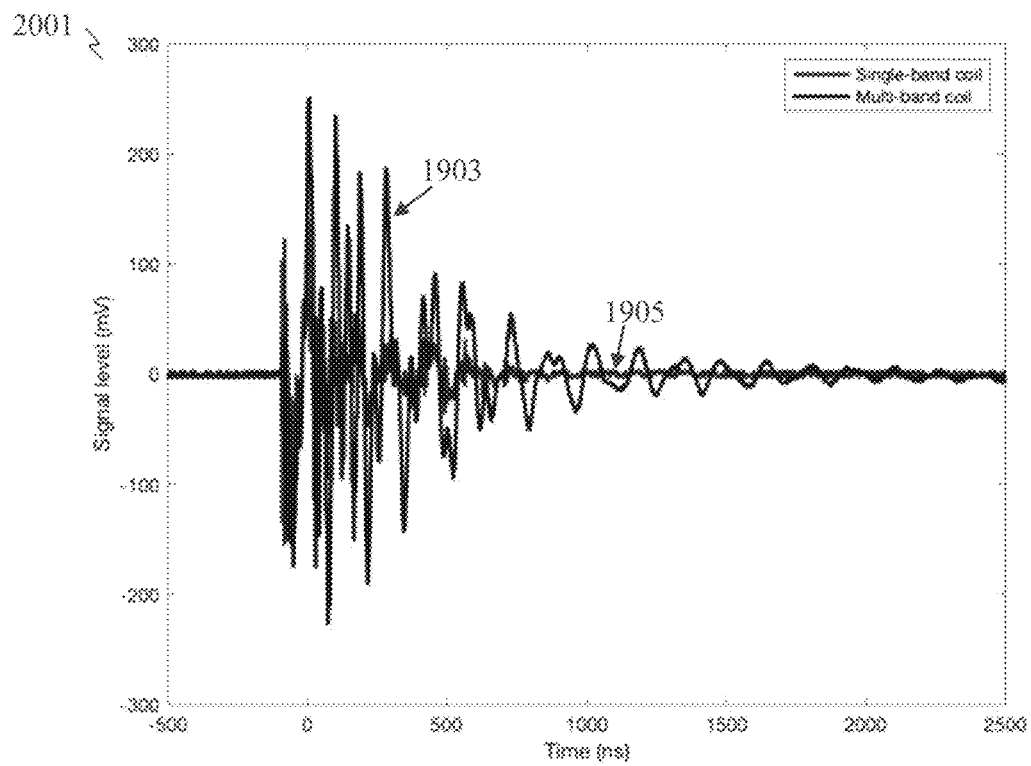
FIG. 20 shows a comparison plot depicting the time-domain PD signal captured by the two different sensing coil designs of FIGS. 17 and 18.

FIG. 19 shows a comparison plot 1901 depicting power spectrum of PD signal captured by the two different sensing coil designs that the multi-band sensing coil 1903 exhibits resonant frequencies at 6.5 MHz, 10.8 MHz, 14.9 MHz and 21.3 MHz. Comparing with the initial designed sensing coil 1905, the power spectrum captured by the multi-band sensing coil 1903 is much higher, which results in 2.5 times larger PD signal waveform in time-domain, as observed in a comparison plot 2001 of FIG. 20 depicting the time-domain PD signal captured by the two different sensing coil designs 1903, 1905.

Each of the two different sensing coil designs 1903, 1905 may be described in similar context of the sensor 102 in FIG. 1A.

Chipless RFID Tag Integrated with PD Sensor

Based on the earlier mentioned design of the ZOR antenna, the delay lines and discontinuities in Sections C, D and E above, respectively, the final chipless RFID tag may be fabricated with an overall size of 69 mm (L)×40 mm (W). The final chipless RFID tag may be described in similar context to the time-domain based RFID tag 104 in FIG. 1A. Finally, a PD sensor consists of an RF sensing coil and a detector diode is connected to the end of the tag for PD detection. The PD sensor may be described in similar context to the sensor 102 in FIG. 1A. The coil may be designed with an optimal sensing distance of 10 to 20 cm, which is a 10-turn coil with a size of 35 mm×35 mm and a thickness of 0.52 mm. A Schottky diode with 520 mV turn-on voltage is in parallel with the coil to provide an impedance change if there is a PD event happened.

Figure 21:
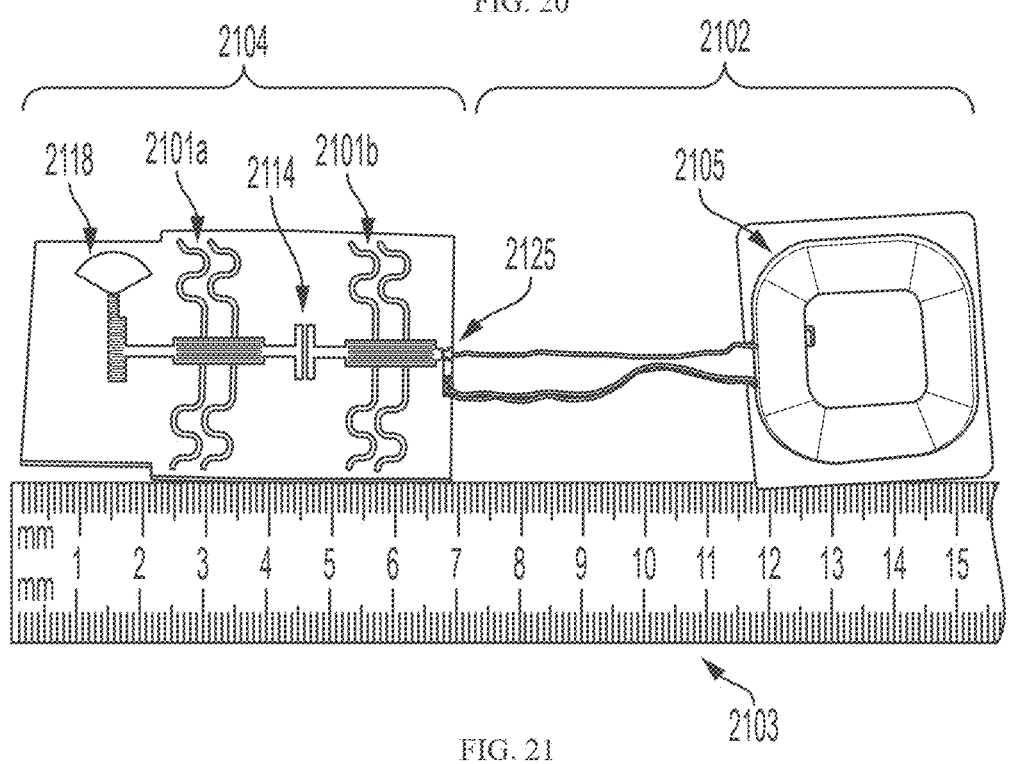
FIG. 21 shows a photograph of a fabricated chipless RFID tag with a diode loaded sensing coil, setup for experimental validation, according to one embodiment.

FIG. 21 shows the fabricated chipless RFID tag 2104 with a diode loaded sensing coil 2105, total length being measured about 15.5 cm when stretched alongside a ruler 2103, for experimental validation. In this example, described in similar context to the prototype 500 of FIG. 5A, the fabricated chipless RFID tag 2104 includes an antenna 2118, a discontinuity 2114 (e.g. CSRR with a capacitive stub) arranged between delay sections 2101a, 2101b. The sensing coil 2105 loaded with the Schottky-barrier diode 2125 serves as the PD sensor 2102, and the tag 2104 provides the ID code associated with the asset. When the coil 2105 senses a PD event, an induced voltage in the coil 2105 turns on the diode 2125 and changes the impedance seen by the tag 2104. It sends a signal to the reader (not shown in FIG. 21), e.g. the external reader 124 in FIG. 1B, at the operating frequency when the tag 2104 is interrogated.

Figure 22A:
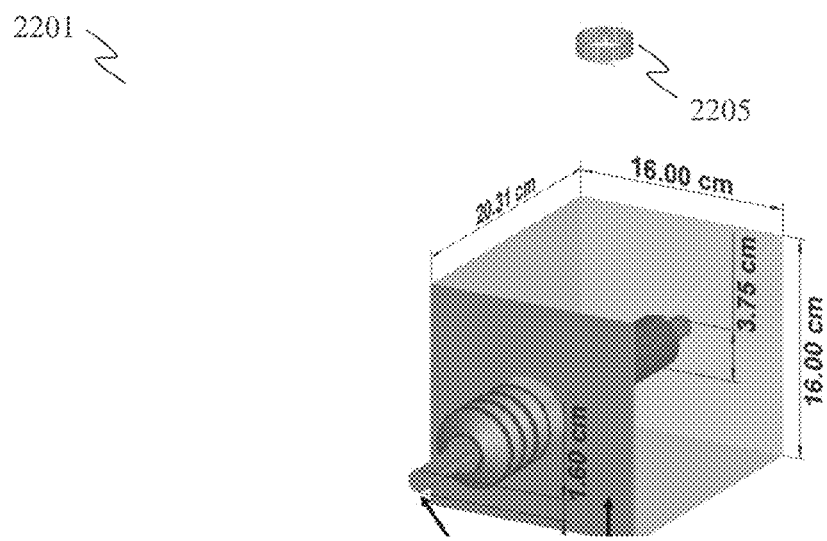
FIG. 22A shows a perspective schematic view of a model of a transformer with bushing having a housing with metallic outer surfaces and insulating inner surfaces, a metallic shaft arranged through an opening on one surface of the housing, and a ringed ceramic member surrounding the shaft, according to one embodiment.
Figure 22B:
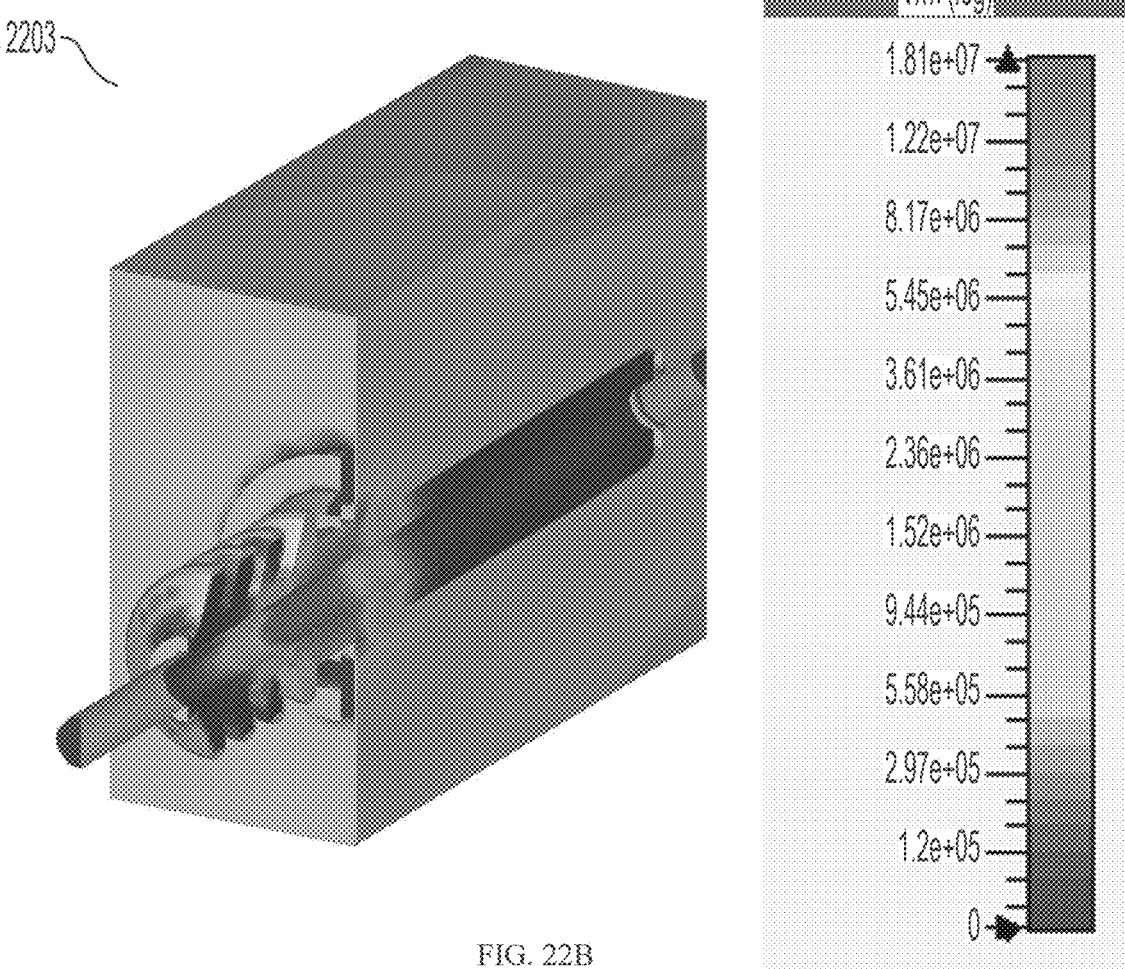
FIG. 22B shows a simulation of electric field distribution using the model of FIG. 22A without the sensing coil.
Figure 22C:
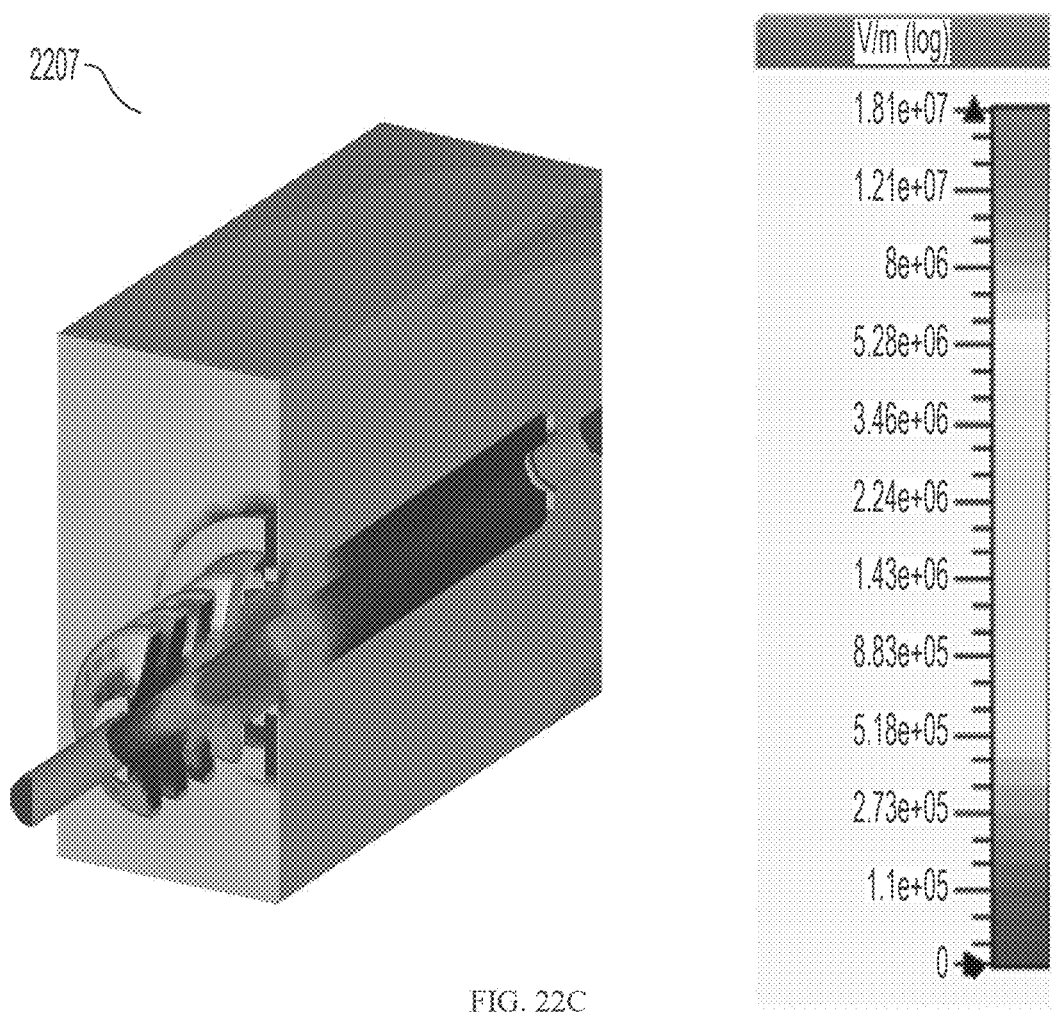
FIG. 22C shows a simulation of electric field distribution using the model of FIG. 22A with the sensing coil.

To understand the possible impact of the mounting of the sensing coil (e.g. 2105) on the insulating elements of asset under monitoring, a bushing of an energized 110 kV high voltage transformer is modelled with CST EM studio, as illustrated in a perspective schematic view 2201 of FIG. 22A. The insulation dielectric constant, $\in_r=3$. The 10-turn sensing coil 2105 is modelled and placed at 15 cm from the top surface of the insulation material. By comparing the simulation results without and with the presence of the coil 2105, as shown in simulation outcomes 2203, 2205 of FIGS. 22B and 22C, respectively; the electrical field distribution in the insulation material is very much the same with the largest difference in the insulation directly underneath the coil 2105, being less than 5%.

Figure 23:
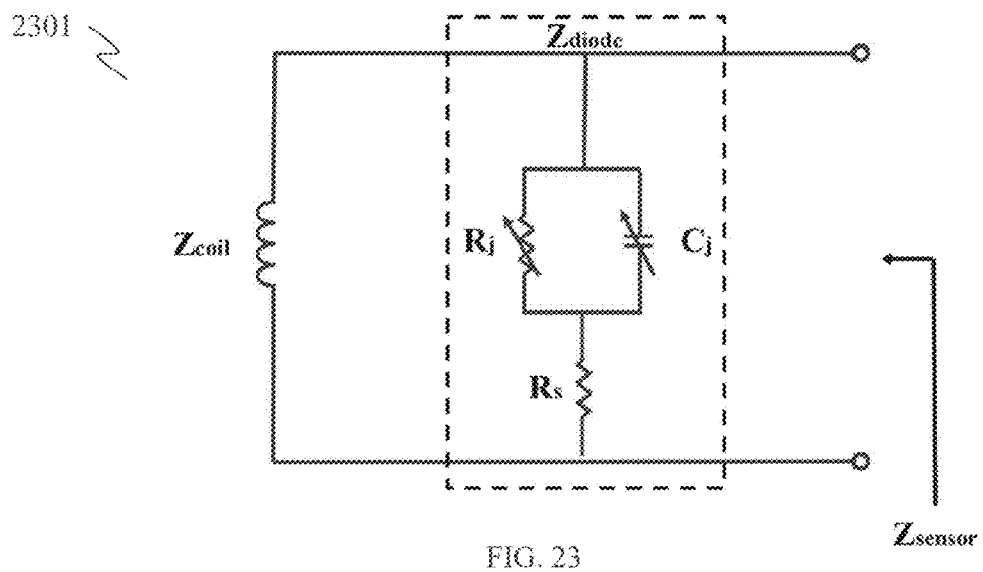
FIG. 23 shows the equivalent circuit of a diode loaded sensing coil, according to one embodiment.

FIG. 23 shows the equivalent circuit 2301 of the sensing coil 2105 with the diode 2125, where $Z_{coil}$ is the equivalent impedance of the coil 2105 and $Z_{diode}$ is the equivalent impedance of the diode 2125 that is represented by its junction resistance $R_j$, junction capacitance $C_j$ and series resistance $R_s$. The impedance of the PD sensor 2102 is given by Equations (10)-(12).

where $$Z_{sensor} = Z_{coil} // Z_{diode} \quad \text{Equation (10)}$$

$$Z_{diode} = R_s + R_j//(-j/\omega C_j) \quad \text{Equation (11)}$$

$$Z_{coil} = R_{coil} + j\omega L_{coil} \quad \text{Equation (12)}$$

Figure 24A:
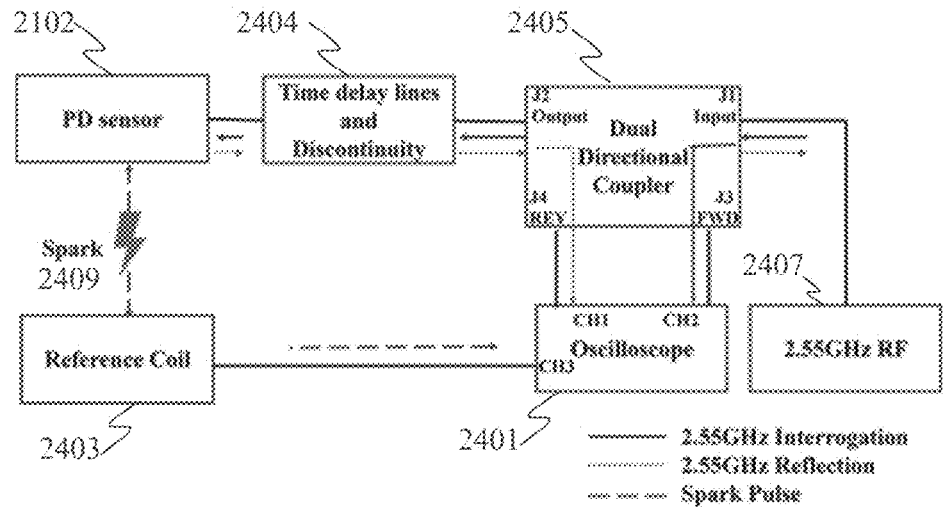
FIG. 24A shows a block diagram of a measurement setup of a PD detection system, according to one embodiment.
Figure 24B:
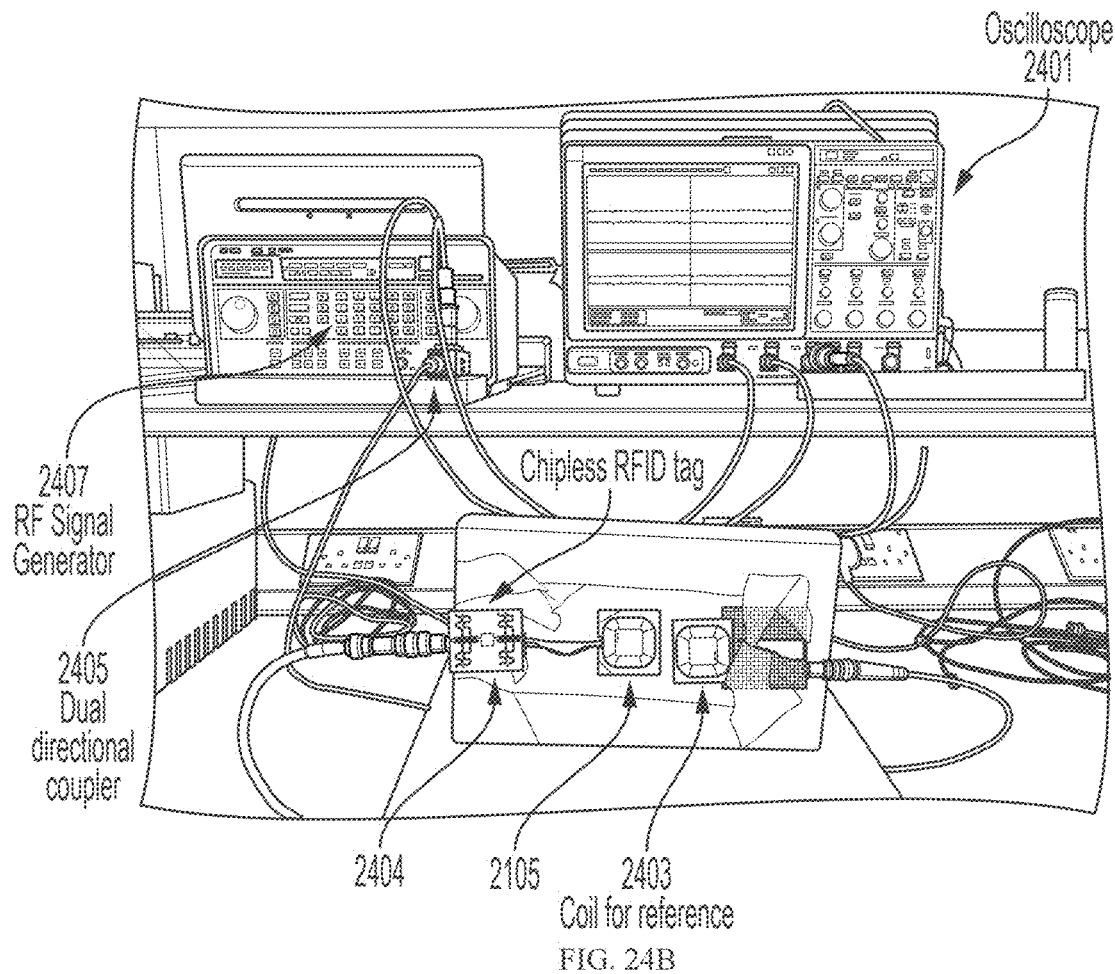
FIG. 24B shows a photograph of a measurement actual setup of a PD detection system, according to one embodiment.

Through measurement, $L_{coil}$=16.70 µH. Based on the datasheet of the Schottky diode 2125 (MMSD 301T1G), $C_j$=0.9 pF and $R_j$=52Ω at 520 mV forward voltage and $R_j$=2 kΩ at 200 mV forward voltage. $R_s$ and $R_{coil}$ are usually small and may be neglected. Once the diode 2125 turns on by a PD event, there is a large impedance change in $Z_{sensor}$ at the operating frequency of 2.55 GHz. A PD detection and identification measurement system are set up with an oscilloscope (Tektronix DPO7354) 2401, an RF signal generator (Agilent 8648D) 2407 and a dual directional coupler (AR RF/Microwave Instrumentation DC7144A) 2405, as shown in a schematic block diagram and a photograph of FIGS. 24A and 24B, respectively. Channels CH1 and CH2 of the oscilloscope 2401 measure the interrogating and reflecting signals, respectively. Channel CH3 measures the signal voltage induced in the sensing coil 2105 by measuring across a reference coil 2403. The sampling rate of each channel is set to 10 GS/s with a 3.5 GHz bandwidth. A spark generator 2409 is placed at 10 cm away from the coil to emulate a PD event. As air breakdown happens at 3000 kV/m, the spark generator 2409 is designed with a spark gap of 1 mm energized with a 3 kV pulse. In this setup, as no remote communication was required, the chipless RFID tag 2404 was fabricated with a discontinuity and time delay lines/sections, without an antenna.

Figure 25:
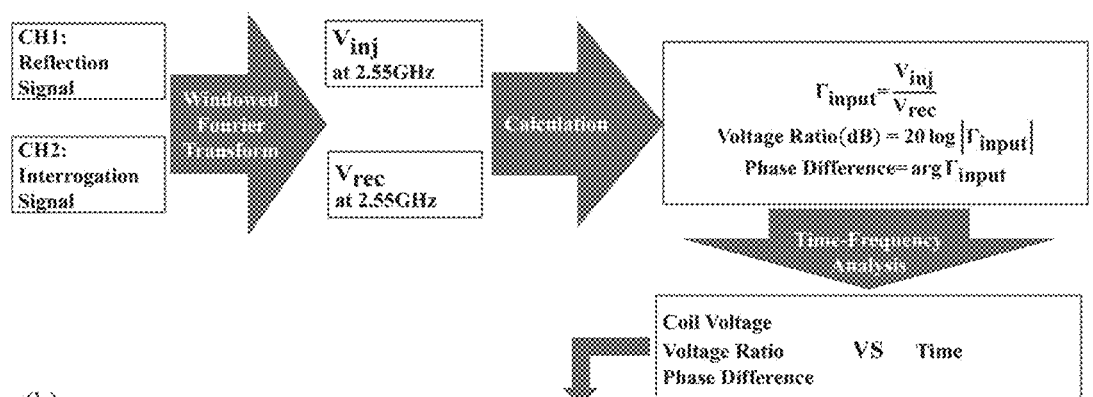
FIG. 25 shows (a) a flow chart illustrating the signal processing of the measured data based on the measurement setup of FIGS. 24A and 24B, (b) a plot illustrating the coil voltage vs time relationship, (c) a plot illustrating the voltage ratio vs time relationship, and (d) a plot illustrating the phase difference vs time relationship.
Figure 25:
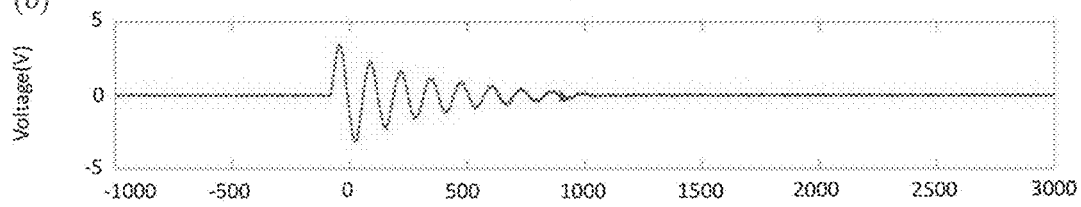
Figure 25:
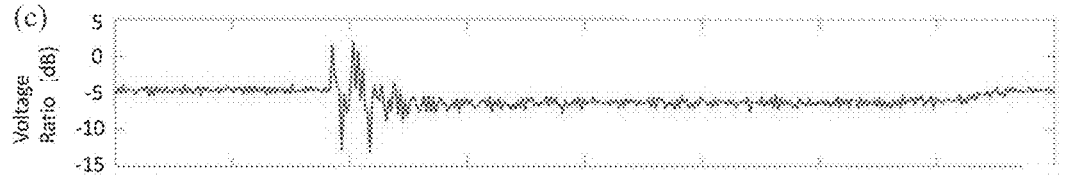
Figure 25:
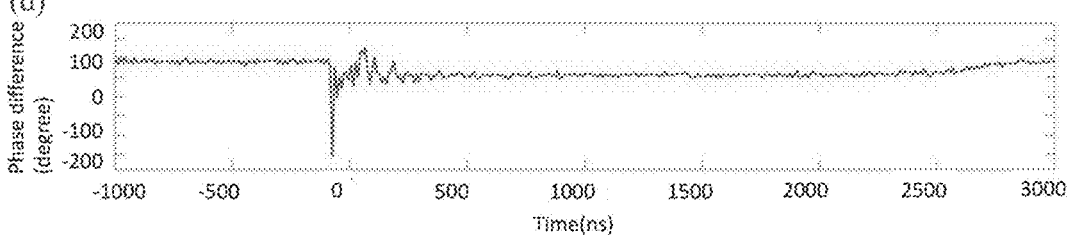

FIG. 25 shows (a) a flow chart illustrating the signal processing of the measured data, where $\Gamma_{input}$ may be calculated by the measured injecting signal $V_{inj}$ and receiving signal $V_{rec}$ based on the equation given in FIG. 25, (b) a plot illustrating the coil voltage vs time relationship, (c) a plot illustrating the voltage ratio vs time relationship, and (d) a plot illustrating the phase difference vs time relationship.

Firstly, the received interrogating and reflecting signals are processed using Windowed Fourier Transformed (WFT) with a 3 ns window size and their respective complex values are extracted at 2.55 GHz. Then the phase difference between two signals at different time intervals are computed and stored. The measurement results of the four fabricated tags with different phase changes are listed in Table 7.

TABLE 7

| Tag | CSRR1 | CSRR2 | SRR2 | SRR1 |
| --- | --- | --- | --- | --- |
| Phase difference at normal | 90° | 118° | 88° | 157° |
| Phase difference at PD | −156° | −18.4° | −154° | −90° |

It is noteworthy that the phase difference here refers to the phase of the reflected signal with reference to the interrogating signal.

Figure 26:
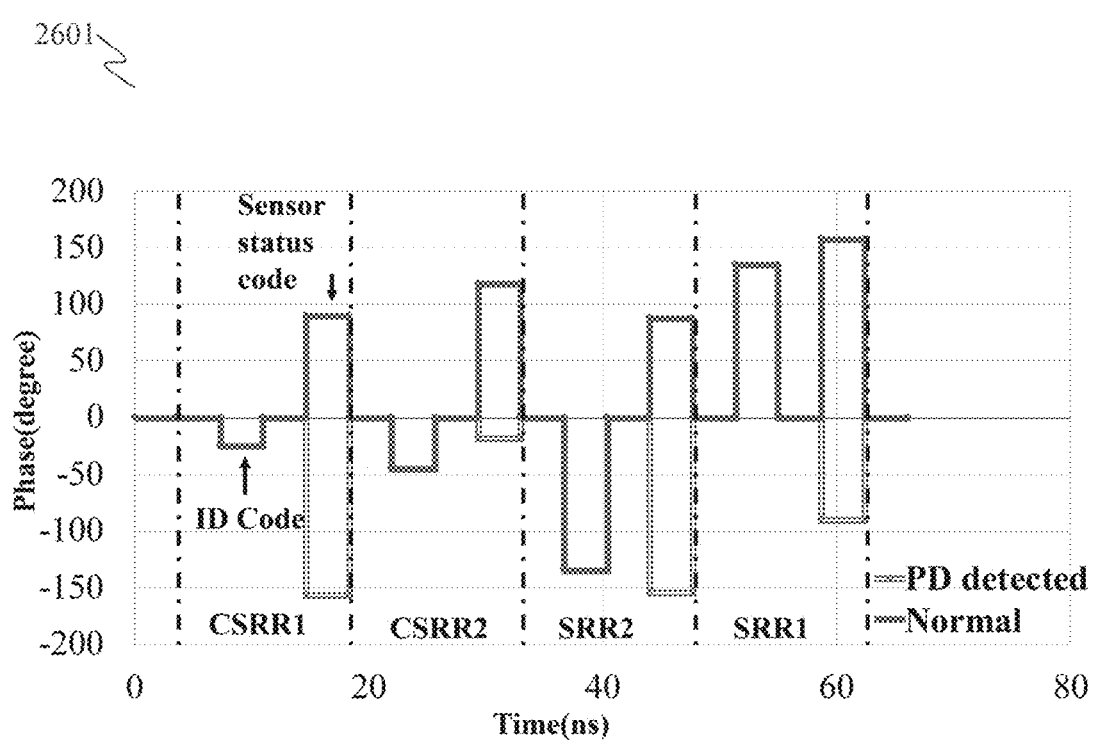
FIG. 26 shows a plot illustrating phase changes of signals received by a reader in a polling cycle of four chipless RFID tags with PD sensors, according to various embodiments.

FIG. 26 shows a plot 2601 illustrating the data extracted from the reader for the four tags with the PD sensors in the sequential order of CSRR1, CSRR2, SRR2 and SRR1. The first phase change between the interrogating and reflecting signals from each tag is the ID code, and the second phase change indicates if a PD event is detected. Since each tag is mounted onto an electrical asset, the detection of any PD event may be traced back to a specific asset with the unique ID code.

As discussed in the example above, a TD chipless RFID tag with PD sensor for PD detection and identification has been developed, fabricated and verified experimentally. The chipless design offers a batteryless and low-cost solution for PD monitoring of critical electrical assets, such as high-voltage transformers and motors. The proposed design has shown its ability to detect a PD event and to identify the faulty asset that generates the RF emission associated with the PD. Its wireless, batteryless and compact designs enable ease of mounting for multi-asset monitoring and faulty asset identification purposes. The existing diode loaded sensing coil works well for relatively high-intensity PD but may not be sensitive enough to pick up weak PD in the early stages of insulation failure, as the induced voltage in the coil may not be high enough to turn on the diode. Design improvements such as increasing the number of turns of the coil and choosing diode with lower turn-on voltage may be considered. Also, more comprehensive and in-depth analysis may be explored to understand the impact of the PD sensor installation on the insulating elements, especially when the spacing between the active parts and the grounding reference is small.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A device releasably couplable to an electric asset, the device comprising:
    a sensor configured to detect partial discharge from the electric asset and generate a pulsed signal representative of a presence or absence of the detected partial discharge; and
    a time-domain based RFID tag electrically coupled to the sensor, the time-domain based RFID tag configured to provide an ID code uniquely representative of a location of the device when coupled to the electric asset,
    wherein the device is configured to generate, upon interrogation by an external interrogator, a backscattered signal comprising the ID code and the pulsed signal, and the generated backscattered signal is to be read by an external reader, and
    wherein the time-domain based RFID tag comprises a delay line comprising one or more discontinuities, each discontinuity configured to provide one or more unique codes, wherein a unique code from the one or more discontinuities is used as the ID code.

2. The device as claimed in claim 1, wherein the generated pulsed signal including a phase change represents the presence of the detected partial discharge from the electric asset, and the generated pulsed signal including no change in phase represents the absence of partial discharge detected from the electric asset.

3. The device as claimed in claim 1, wherein the sensor comprises at least one sensing coil for detecting the partial discharge; and at least one state-change component connected in parallel to the at least one sensing coil and operable to generate the pulsed signal.

4. The device as claimed in claim 3, wherein the sensor comprises a further sensing coil electrically coupled in series with the at least one sensing coil, and wherein the at least one sensing coil is configured to operate at a first resonant frequency, and the further sensing coil is configured to operate at a second resonant frequency, the first resonant frequency being different from the second resonant frequency.

5. The device as claimed in claim 1, wherein the at least one sensing coil comprises a plurality of sensing coils configured to operate at different resonant frequencies, each resonant frequency separated apart from another, and to provide an extended bandwidth for the sensor, the extended bandwidth being dependent on a spread of the different resonant frequencies.

6. The device as claimed in claim 1, wherein each discontinuity comprises one of the following:
   a split ring resonator, or
   a complementary split ring resonator, or
   a combination of a split ring resonator and a complementary split ring resonator.

7. The device as claimed in claim 1, wherein the discontinuity comprises one of:
   reconfigurable stub lines; or
   reconfigurable stub lines and a phase shifter.

8. The device as claimed in claim 1, wherein the time-domain based RFID tag further comprises a power divider coupled to the discontinuity and arranged along the delay line in a manner such that the discontinuity is indirectly coupled to the delay line through the power divider, wherein the power divider is configured to at least reduce excess signal reflection from the discontinuity, thereby ensuring only one signal reflection is performed by the discontinuity.

9. The device as claimed in claim 1, wherein a distal end of the delay line is coupled to the sensor, thereby enabling a time lapse to be provided between the ID code and the pulsed signal, and
   wherein the time-domain based RFID tag further comprises an antenna coupled to a proximal end of the delay line, the proximal end being opposite to the distal end, the antenna configured to receive an interrogation signal from the external interrogator.

10. The device as claimed in claim 1, further comprising at least one of:
   an antenna coupled in series with time-domain based RFID tag, the antenna configured to receive an interrogation signal from the external interrogator, or
   at least one parameter sensor, each electrically coupled to a time-domain based RFID tag, wherein the at least one parameter sensor is configured to detect at least one parameter experienced by the electric asset for determining an abnormal change in the at least one parameter.

11. The device as claimed in claim 1, wherein the time-domain based RFID tag is a time-domain based chipless RFID tag, or
   wherein the time-domain based RFID tag is a time-domain chipped based RFID tag, and the device further comprises at least one parameter sensor electrically coupled to the time-domain based chipped RFID tag, the at least one parameter sensor being configured to detect at least one parameter experienced by the electric asset for determining an abnormal change in the at least one parameter.

12. An apparatus comprising:
   at least one device as claimed in claim 1, each device releasably couplable to each corresponding electric asset;
   an external interrogator configured to interrogate the at least one device to generate a backscattered signal; and
   an external reader configured to read the backscattered signal to obtain identification of the corresponding electric asset and information on partial discharge experienced by the corresponding electric asset.

13. A method for obtaining identification of at least one electric asset and information on partial discharge experienced by the at least one electric asset, the method comprising:
   sending, by an external interrogator, an interrogation signal to at least one device, each device releasably coupled to each corresponding electric asset;
   detecting, by each device, the partial discharge from the corresponding electric asset;
   generating, by each device, a backscattered signal comprising an ID code uniquely representative of a location of the device coupled to the corresponding electric asset and a pulsed signal representative of a presence or absence of the detected partial discharge, wherein the device comprises a time-domain based RFID tag comprising a delay line, and wherein the step of generating the backscattered signal comprises providing, by one or more discontinuities of the delay line, one or more unique codes; and using a unique code as the ID code; and
   reading, by an external reader, the backscattered signal to obtain identification of the corresponding electric asset and information on partial discharge experienced by the corresponding electric asset.

14. The method as claimed in claim 13, wherein in the step of generating the backscattered signal, a state-change component of the device remains at a first state when substantially no partial discharge is detected such that the phase of the pulsed signal remains unchanged, and the state-change component is turned to a second state by an induced pulsed voltage of the detected partial discharge to provide a phase change in the pulsed signal.

15. The method as claimed in claim 13, wherein the step of detecting the partial discharge comprises capturing energy of the partial discharge over an extended bandwidth of a sensor of the device, wherein the sensor comprises a plurality of sensing coils operating at different resonant frequencies, the extended bandwidth being dependent on a spread of the different resonant frequencies.

16. The method as claimed in claim 13,
   wherein the step of providing the one or more unique codes comprises generating the one or more unique codes based on phase shift keying modulations, and
   wherein the phase shift keying modulations is one of: quadrature phase shift keying modulations, or 16 phase shift keying modulations.

17. The method as claimed in claim 16, further comprising at least one of:
   at least reducing, by a power divider, excess signal reflection from the discontinuity, wherein the power divider is electrically coupled to the discontinuity and arranged along the delay line in a manner such that the discontinuity is indirectly coupled to the delay line through the power divider, or
   receiving, by an antenna of the at least one device, the interrogation signal.

18. The method as claimed in claim 13, further comprising detecting, by at least one parameter sensor of each device, at least one parameter experienced by the corresponding electric asset for determining an abnormal change in the at least one parameter, wherein each of the at least one parameter sensor is electrically coupled to a time-domain based RFID tag.

19. The method as claimed in claim 13, wherein the time-domain based RFID tag is a time-domain chipped based RFID tag, and the method further comprises detecting, by at least one parameter sensor of each device, at least one parameter experienced by the corresponding electric asset for determining an abnormal change in the at least one parameter, wherein the at least one parameter sensor is electrically coupled to the time-domain based chipped RFID tag.

20. A device releasably couplable to an electric asset, the device comprising:
- a sensor configured to detect partial discharge from the electric asset and generate a pulsed signal representative of a presence or absence of the detected partial discharge; and
- a time-domain based RFID tag electrically coupled to the sensor, the time-domain based RFID tag configured to provide an ID code uniquely representative of a location of the device when coupled to the electric asset, wherein the device is configured to generate, upon interrogation by an external interrogator, a backscattered signal comprising the ID code and the pulsed signal, and the generated backscattered signal is to be read by an external reader, the sensor comprises:
- at least one sensing coil for detecting the partial discharge; and
- at least one state-change component connected in parallel to the at least one sensing coil and operable to generate the pulsed signal, the at least one sensing coil comprising a plurality of sensing coils configured to operate at different resonant frequencies, each resonant frequency separated apart from another, and to provide an extended bandwidth for the sensor, the extended bandwidth being dependent on a spread of the different resonant frequencies, and the sensor forms a terminating end of the device.

* * * * *